United States Patent [19]
Shimazu

[11] Patent Number: 5,619,694
[45] Date of Patent: Apr. 8, 1997

[54] CASE DATABASE STORAGE/RETRIEVAL SYSTEM

[75] Inventor: Hideo Shimazu, Tokyo, Japan

[73] Assignee: NEC Corporation, Tokyo, Japan

[21] Appl. No.: 296,464

[22] Filed: Aug. 26, 1994

[30] Foreign Application Priority Data

Aug. 26, 1993 [JP] Japan .................... 5-211270
Nov. 29, 1993 [JP] Japan .................... 5-297172
Dec. 21, 1993 [JP] Japan .................... 5-322526

[51] Int. Cl.$^6$ .................... G06F 17/30
[52] U.S. Cl. .................... 395/615; 395/51; 395/348
[58] Field of Search .................... 364/424.03, 580; 395/159, 154, 600, 51, 50

[56] References Cited

U.S. PATENT DOCUMENTS

| | | | |
|---|---|---|---|
| 5,040,214 | 8/1991 | Grossberg et al. | 381/43 |
| 5,043,987 | 8/1991 | Stark et al. | 371/26 |
| 5,313,574 | 5/1994 | Beethe | 395/159 |
| 5,313,575 | 5/1994 | Beethe | 395/159 |
| 5,325,481 | 6/1994 | Hunt | 395/159 |
| 5,408,412 | 4/1995 | Hogg et al. | 364/424.03 |
| 5,437,007 | 7/1995 | Bailey et al. | 395/159 |
| 5,444,823 | 8/1995 | Nguyen | 395/51 |

OTHER PUBLICATIONS

Czejdo et al., "A Visual Query Language For an ER Data Model", 1989 IEEE Workshop on Visual Languages, Rome, Italy 4–6 Oct. 1989, pp. 165–170.
Catarci et al., "Iconic and Diagrammatic Interfaces: AnIntegrated Approach", Proceedings. 1991 IEEE Workshop on VisualLanguages, Kobe Japan, 8–11 Oct. 1991, pp. 199–204.
E. Simoudis, "Using Case–Based Retrieval For Customer TechnicalSupport", IEEE Expert, vol. 7, No. 5, Oct. 1992, pp. 7–12.
M. Keen, "Case Bases for Help Desks", IEE Colloquium on 'Case–Based Reasoning', London, England, 12 Feb. 1993, pp. 8/1–8/25.
Massari et al., "An Iconic Query System With Intensional-Feedback", Proceedings 1993 IEEE Symposium on Visual Languages,Bergen, Norway, 24–27 Aug. 1993, pp. 386–388.
Kriegsman et al., "Building a Case–Based Help Desk Application",IEE Expert, vol. 8, No. 6, Dec. 1993, pp. 18–26.
D. McCarthy, "Automation of Help Desks Using Case–BasedReasoning", IEE Colloquium ON 'Case–Based Reasoning'. Prospectsfor Applications, London, England, 3 Mar. 1994, pp. 9/1–9/3.
Bub et al., "A Case–Based Reasoning System for Troubleshooting",IEE Colloquium ON 'Case–Based Reasoning'. Prospects forApplications, London, England, 3 Mar. 1994, pp. 5/1–5/9.

Primary Examiner—Thomas G. Black
Assistant Examiner—Paul R. Lintz
Attorney, Agent, or Firm—Foley & Lardner

[57] ABSTRACT

A case database storage/retrieval system comprises a database for storing as a case contents occurred on an object, a script storage section for storing at least one script which describes a typically conducted series of operation and condition descriptions in time order with regard to the object containing the case within the database, a case storage control section for defining a related link between a new case and a specific operation and situation description in the script relating to the new case in order to relate them, and for storing the new case into the database, and a case retrieval section for retrieving to output a case related by the related link from the database, with respect to a specific operation and situation description designated in the specific script.

17 Claims, 18 Drawing Sheets

FIG. 5

| CASE | RELATED LINK/INDEX |
|---|---|
| CASE 1 | SCRIPT 1, UNIT DESCRIPTION 2 |
| CASE 3 | SCRIPT 1, UNIT DESCRIPTION 5 |
| CASE 4 | SCRIPT 2, UNIT DESCRIPTION 5 |
| CASE 5 | SCRIPT 3, UNIT DESCRIPTION 5 |
| CASE 6 | VISUAL SCRIPT 5, BUTTON SWITCH 1 |
| CASE 7 | VISUAL SCRIPT 7, BUTTON SWITCH 3 |
| CASE 10 | VISUAL SCRIPT 12, BUTTON SWITCH 3 |

FIG. 11

| CASE | RELATED LINK/INDEX |
|---|---|
| CASE 1 | BUTTON SWITCH 1 |
| CASE 3 | BUTTON SWITCH 3 |
| CASE 4 | BUTTON SWITCH 5 |
| CASE 5 | BUTTON SWITCH 6 |
| CASE 6 | BUTTON SWITCH 9 |
| CASE 7 | BUTTON SWITCH 11 |
| CASE 10 | BUTTON SWITCH 13 |

102 OBJECT AREA TWO-DIMENSIONAL INFORMATION

102 OBJECT AREA TWO-DIMENSIONAL INFORMATION

| CAR NAME | COLOR | TYPE | PRICE | MAKER |
|---|---|---|---|---|
| A | RED | SEDAN | 1000000 | T |
| B | WHITE | COUPE | 1200000 | T |
| C | BLUE | SEDAN | 3000000 | N |
| D | BROWN | SEDAN | 1100000 | H |

CASE DATABASE STORAGE/RETRIEVAL SYSTEM

BACKGROUND OF THE INVENTION

1. Field of the Invention

This invention relates to a case database storage/retrieval system which effectively stores and swiftly retrieves case data such as claims and inquiries from customers including operation descriptions and situation descriptions variable with time, relational expressions of object physical components, object photograph information, and organizational information.

2. Description of the Related Art

Some companies which sell products and provide services have a section to receive inquiries and claims from customers. This section stores the received inquiries and claims as a database. In case of receiving an additional inquiry or claim, the section retrieves the database to check if there was a similar inquiry or claim. And, if there was, the response which was used in the past case is referred to as an aid to deal with the additional inquiry or claim.

To make such inquiry and claim cases into the database, two methods are available. One method provides a hierarchy of concepts showing the contents of cases and fastens the cases to the leaves of the hierarchy in order to store them as shown in FIG. 21. The example of FIG. 21 stores inquiry cases concerning a personal computer communication service. For example, several typical classifications are lined below the leading node "inquiry" showing all inquiries. And, one of them is an "electronic mail". This electronic mail node is further classified into "sending" and "receiving", and actual inquiry cases are fastened to them. When retrieving, this concept hierarchy is traced from top to bottom. Specifically, an overview of the retrieving content is first understood, it is further classified in detail, and the concept hierarchy is traced downward.

A second method uses a relational database management system to express each case as one record of the relational database as shown in FIG. 22.

In the relational data base, each record is expressed as a collection of attribute values. Therefore, the collection of these records is represented as a two-dimensional table. When retrieving, an inquiry is decomposed into several attributes, and the conditions of these attributes are established. For example, FIG. 22 shows a database of automobiles. When "a car name is A, a color is of a red family, and a type is sedan" are specified, setting of specific conditions with respect to these attributes (car name, color and type) can form a retrieval equation for the database. In the case of SQL (structured query language) which is a database language for the relational data base, the retrieval equation is as follows.

Select * from database where car name="A" and color in ("red", "orange") and type="sedan";

The above case database is heavily required to be able to be retrieved quickly, because retrieval cannot take time when a customer makes an inquiry by telephone or face to face. But, a certain type of inquiry or claim may have a significant meaning in the permutation of situation or operation which changes with time. For example, claim information on a specific product from a customer generally expresses, "When I conducted X, the machine responded as Y. And, when I tried to conduct Z, there was no response."

In this example, retrieval using the case databases of FIG. 21 and FIG. 22 has difficulty.

In the concept hierarchy exemplified in FIG. 21, the top and bottom nodes of the hierarchy have differences to make the same content abstract to express or more specific to express. And, next to the hierarchy, there is no meaningful relation between the nodes at the same level. For example, the "introduction", "connection" and "electronic mail" in FIG. 21 are nodes present at the same level, but they have no relation in meaning. Therefore, a case, "When I conducted X, the machine responded as Y. And, when I tried to conduct Z, there was no response." which corresponds to a flow of situation and operation with time cannot be retrieved.

And, when the relational database exemplified in FIG. 22 is used, there is no meaningful relation among individual attributes in the relational database. For example, the "car name", "color" and "type" attributes are independent respectively in FIG. 22. Therefore, a case corresponding to a flow of situation and operation with time cannot be retrieved.

In the above case database, the retrieval by a special indexing may have a significant meaning. Its example will be described below.

First, a condition which changes with time and a description of operating situations may have a significant meaning.

For example, in the example of claim information about a specific product from a customer, "When I conducted X, the machine responded as Y. And, when I tried to conduct Z, there was no response.", a status change with time of the operation and condition between the user and the machine is expressed. In this case, when the static concept hierarchy of FIG. 21 is represented or the record in the relational table of FIG. 22 is represented, there was a disadvantage of making a retrieval equation difficult how retrieval can be made when storing or retrieving. This is because each node (section) in the hierarchy has difficulty in expressing a status change variable with time in the concept hierarchy of FIG. 21. Furthermore, when the retrieval must be made swiftly to respond to a customer by telephone or at the window, taking time to retrieval is a very serious problem.

Second, the relation of an object component may have a significant meaning.

For example, in claim information about a specific product from a customer, a typical expression is, "A trouble took place when data was transmitted from one module to another module." In this example, the object is a specific product. And, the customer uses a spatial relation of the object components to explain his complaint. In this case too, there are disadvantages of making storing and retrieving difficult when the static concept hierarchy of FIG. 21 is used to express or the relational table of FIG. 22 is used to manage. This is because the individual nodes (section) in the hierarchy have difficulty to express a spatial condition in the concept hierarchy of FIG. 21.

Third, object physical image information may have a significant meaning.

For example, in claim information about a specific product received from a customer by telephone, a typical expression is, "When the second red button from right is turned, a lamp below it blinks." In this case, the object is a specific product. And, the complaint is explained on the precondition that a physical image on the object photograph is just in sight. In this case, there are disadvantages of making storing and retrieving difficult when the static concept hierarchy of FIG. 21 is used to express or the relational table of FIG. 22 is used to manage. This is because the individual nodes (section) in the hierarchy have difficulty to express an object physical appearance condition in the concept hierarchy of FIG. 21.

Fourth, the organized expression of an object may have a significant meaning.

For example, when technical information about a specific product is circulated in-house, a typical expression is, "You had better make an inquiry about difficulty information on word processor software to XX Development Dept. 2 which often designs. But, actual development is made by a subcontractor, YY Software 3, and production is made, too." In this example, the object is the relation between specific organizations. As a difficulty memo retrieval index, the organization (e.g. XX Development Dept. 2) and the relation between the organizations (XX Development Dept. 2 and YY Software 3) are used. In this case, there are disadvantages of making storing and retrieving difficult when the static concept hierarchy of FIG. 21 is used to express or the relational table of FIG. 22 is used to manage. This is because the individual nodes (section) in the hierarchy have difficulty to express an object physical appearance condition in the concept hierarchy of FIG. 21.

SUMMARY OF THE INVENTION

A first object of the invention is to provide a case database storage/retrieval system which can effectively store and swiftly retrieve case data such as claims and inquiries including changes of conditions and operations with time, relational expressions of object physical components, object photograph information, and organizational information.

A second object of the invention is to provide a case database storage/retrieval system which can swiftly retrieve closely corresponding cases even if there is no case which complexly matches a user's demand.

A third object of the invention is to provide a case database storage/retrieval system which can easily retrieve many cases.

A fourth object of the invention is to provide a case database storage/retrieval system which can retrieve an appropriate case corresponding to a target, according to an action taken or a situation occurred in a process to reach the target intended by a customer, from a collection of cases which describes changes of situations with time.

According to one aspect of the invention, a case database storage/retrieval system comprises:

a database for storing as a case the contents occurred on an object, a script storage means for storing at least one script which describes a typically conducted series of operation and situation descriptions in time order with regard to the object containing the case within said database, a case storage control means for defining a related link between a new case and a specific operation and situation description in said script relating to said new case in order to relate them, and for storing said new case into said database, and a case retrieval means for retrieving to output a case related by said related link from said database, with respect to a specific operation and situation description designated in the specific script.

In the preferred construction, said case storage control means defines a similarity link between the operations and situations in said script having similarity in terms of meaning, between the operations and situations in said script and said script, and between the description of operations and situations of a specific script and the description of operations and situations in other scripts in order to relate them.

Also, said case storage control means defines a similarity link between the operation and situation descriptions in said script having similarity in terms of meaning, between the operation and situation description in said script and said script, and between the description of operations and situations in a specific script and the description of operations and situations in other scripts in order to relate them, and said case retrieval means retrieves and outputs a case related by said related link from said database with regard to the description of designated specific operations and situations in a specific script, and retrieves and outputs from said database a case connected by said related link from the description of operations and situations in the script related by said similarity link.

In the preferred construction, said case storage control means defines by adding a similarity value showing a degree of similarity a similarity link between the operation and situation descriptions in said script having similarity in terms of meaning, between the operation and situation description in said script and said script, and between the description of operations and situations in a specific script and the description of operations and situations in other scripts in order to relate them, and said case retrieval means retrieves and outputs a case related by said related link from said database with regard to the description of designated specific operations and situations in a specific script, and retrieves and outputs together with said similarity value added to said similarity link from said database a case connected by said related link from the description of operations and situations in the script related by said similarity link.

According to another aspect of the invention, a case database storage/retrieval system comprises:

a database for storing as a case contents occurred on an object, a script storage means for storing at least one visual script which expresses the components of said object and the relation between the components in two-dimensional information, and has selective switches arranged for said two-dimensional information with regard to the object containing the case within said database, a case storage control means for defining a related link between a new case and a specific switch in said visual script relating to said new case in order to relate them, and for storing said new case into said database, and a case retrieval means for retrieving to output a case related by said related link from said database, with respect to a specific switch designated in the specific visual script.

In this case, said case storage control means defines a similarity link between the two-dimensional information in said visual script having similarity in terms of meaning, and between the two-dimensional information in a specific visual script and the two-dimensional information in another visual script in order to relate them.

In the above-mentioned construction, said case storage control means defines a similarity link between the two-dimensional information in said visual script having similarity in terms of meaning, and between the two-dimensional information in a specific visual script and the two-dimensional information in another visual script in order to relate them, and said case retrieval means retrieves and outputs a case related by said related link from said database with regard to a specific switch designated in a specific visual script, and retrieves and outputs from said database a case connected by said related link from a switch in the visual script related by said similarity link.

In the above-mentioned construction, said case storage control means defines a similarity link by adding a similarity value showing a degree of similarity between the two-dimensional information in said visual script having similarity in terms of meaning, and between the two-dimensional information in a specific visual script and the two-dimensional information in another visual script in order to relate them, and said case retrieval means retrieves and outputs a case related by said related link from said database with regard to a specific switch designated in a specific visual script, and retrieves and outputs together with said similarity value added to said similarity link from said database a case connected by said related link from a switch in the visual script related by said similarity link.

Also, said case storage control means defines a hierarchy link between the two-dimensional information in said visual script having similarity in terms of meaning and another visual script in order to relate them, and said case retrieval means outputs said other visual script related by said hierarchy link with respect to a specific switch designated in a specific visual script.

The case storage control means defines a similarity link by adding a similarity value showing a degree of similarity between the two-dimensional information in said visual script having similarity in terms of meaning, and between the two-dimensional information in a specific visual script and the two-dimensional information in another visual script in order to relate them, and defines a hierarchy link between the two-dimensional information in said visual script having similarity in terms of meaning and another visual script in order to relate them, and said case retrieval means retrieves and outputs a case related by said related link from said database with regard to a specific switch designated in a specific visual script, and retrieves and outputs together with said similarity value added to said similarity link from said database a case connected by said related link from a switch in the visual script related by said similarity link, and outputs said other visual script related by said hierarchy link with respect to a specific switch designated in the specific visual script.

According to a still further aspect of the invention, a case database storage/retrieval system comprises:

a database for storing as a case the contents occurred on an object, a script storage means for storing a script which describes a typically conducted series of operation and situation descriptions in time order with regard to the object containing the case within said database, and a visual script which represents in two-dimensional information the components of said object and the relation between the components and arranges a selectable switch for said two-dimensional information with respect to the object containing the case within said database, a case storage control means for defining a related link between a new case and a switch of a specific operation and situation description in said script related to the new case or said visual script in order to relate them, and a case retrieval means for retrieving to output a case related by said related link, with respect to the specific operation and situation description designated in the specific script.

In the above-mentioned construction, said case storage control means defines a similarity link between the operation and situation descriptions in said script having similarity in terms of meaning, between two-dimensional information of said visual script, between the operation and situation description of a specific script and two-dimensional information of a visual script, and between the operation and situation description in said script or the two-dimensional information of said visual script and the operation and situation description or two-dimensional information of another script in order to relate them.

Also, said case storage control means defines a similarity link between the operation and situation descriptions in said script having similarity in terms of meaning, between two-dimensional information of said visual script, between the operation and situation description in a specific script and two-dimensional information of a visual script, and between the operation and situation description in said script or the two-dimensional information of said visual script and the operation and situation description or two-dimensional information of another script in order to relate them, and said case retrieval means retrieves and outputs a case related by said related link from said database with regard to the specific operation and situation description or switch designated in a specific script, and retrieves and outputs from said database a case connected by said related link from the operation and situation description or switch in the script related by said similarity link.

Also, said case storage control means defines a similarity link by adding a similarity value showing a degree of similarity between the operation and situation descriptions in said script having similarity in terms of meaning, between two-dimensional information of said visual script, between the operation and situation description of a specific script and two-dimensional information of a visual script, and between the operation and situation description in said script or the two-dimensional information of said visual script and the operation and situation description or two-dimensional information of another script in order to relate them, and said case retrieval means retrieves and outputs a case related by said related link from said database with regard to the specific operation and situation description or switch designated in a specific script, and retrieves and outputs together with said similarity value added to said similarity link from said database a case connected by said related link from the operation and situation description or switch in the script related by said similarity link.

According to a still further aspect of the invention, a case database retrieval system comprises:

a case database for storing cases occurred on objects, and a collection of scripts which at least stores a script arranging in time order a unit description describing a typical operation or situation taken to reach an assumed target with respect to said object, or a visual script expressing in two-dimensional information the components of said object and the relation between the components with respect to the object and arranging a selectable switch for said two-dimensional information, among the unit description of said script and the two-dimensional information of the visual script, for the unit description or two-dimensional information related to a specific case of said case database, a related link being disposed to relate the specific case with an inquiry, although the unit description of said script being not directly related to the two-dimensional information of the visual script, when the script being seen as a whole, it being related to said specific case, then an indirectly related link being disposed to indicate an indirect relation between said script or said entire visual script and said specific case, and a case retrieval means for retrieving to output from said database a case related by said related link or a case related by said indirect related link, with respect to the specific operation and situation description or switch designated in a specific script.

In the above mentioned construction, a case database retrieval system further comprises:

disposing a similarity link having a similarity value to indicate a degree of similarity between similar unit descriptions contained in the same script or between two-dimensional information, and disposing a similarity link having a similarity value to indicate a degree of similarity between similar unit descriptions contained in different scripts or between two-dimensional information.

Also, said case retrieval means comprises:

a step to retrieve and output from said case database a case related by said related link from said designated unit description or two-dimensional information, when there are other unit descriptions or two-dimensional information in the same script related by said similarity link from said designated unit description or two-dimensional information, a step to retrieve from said case database and to output together with the similarity value added to said similarity link a case related by said related link from said other unit description or two-dimensional information, a step to retrieve and output from said case database a case related by said indirect related link from said designated specific script or visual script, and when there are other unit descriptions or two-dimensional information in other scripts related by said similarity link from said designated unit description or two-dimensional information, a step to retrieve from said case database a case related by said related link and the unit description or two-dimensional information in said other scripts, and to output a word and case representing that said case is related to said other scripts.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 5 is an explanatory view of examples realizing related links by a relational table.

FIG. 11 is an explanatory view of examples realizing related links by a relational table.

DESCRIPTION OF THE PREFERRED EMBODIMENT

Figure 1:
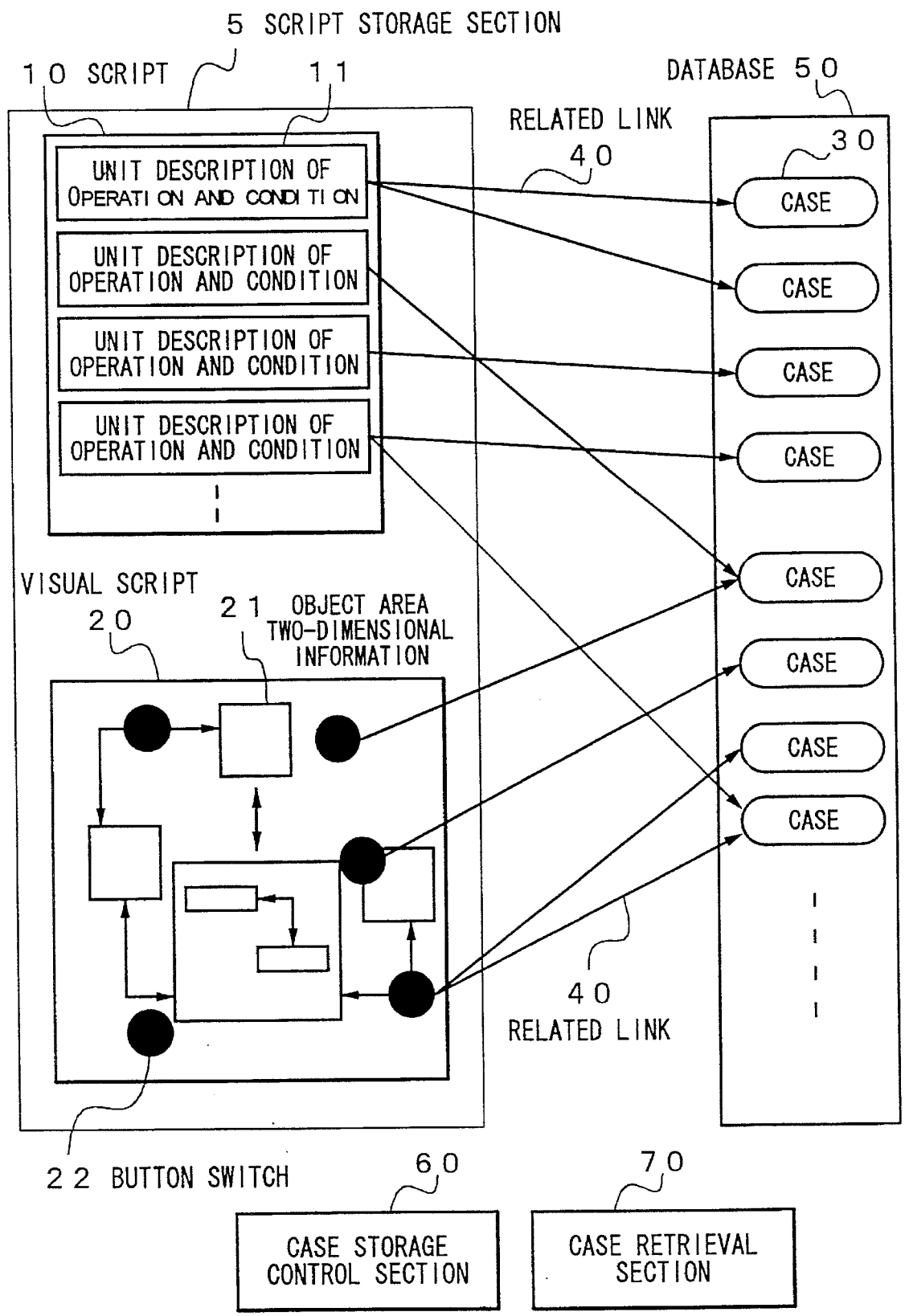
FIG. 1 is a block diagram showing a configuration of the case database storage/retrieval system according to a first embodiment.

Preferable embodiments of the invention will be described in detail with reference to the attached drawings. FIG. 1 is a block diagram showing the configuration of a first embodiment of the case database storage/retrieval system according to the invention. In FIG. 1 showing the first embodiment, a script 10 which is stored in a script storage section 5 describes strings of a unit description 11 which describes a series of operations and situations typically conducted with respect to objects containing cases of inquiries and claims present in the database. The script 10 is present in the number corresponding to that of typical situations.

For example, an example of the script 10 with respect to a collection of inquiry cases concerning an object "electronic mail" may be considered a script having contents such as "sending a mail", "receiving a mail", "transferring a mail", "uploading a local file when sending a mail", and "downloading the contents of a main being received into a local file."

In a visual script 20, object components concerning cases in the database and a flow of control and data between the components are represented as two-dimensional information (image information) 21, and selectable button switches 22 are disposed on the two-dimensional information 21. The visual script 20 is present in the number corresponding to that of typical components represented by the two-dimensional information 21.

For example, when an object is a collection of inquiry cases concerning a specific "electronic mail", components such as "a terminal of a sender", "a modem of a sender", "a telephone line", "a telephone receiver on the host side", "a mailbox of the host", "a mail interpreting program in the host", "a terminal of a receiver", "a modem of a receiver", and "a telephone line" are represented as two-dimensional information, and an image which connects the two-dimensional information with a line representing a flow of data and control becomes one visual script 20. Further, it is also possible to separately provide a visual script which does not represent as one component the mail interpreting program present in the host but represents its contents. For example, it is possible to define a visual script consisting of a mail sending module, a mail receiving module, a transferring module, and a mailbox managing module.

Each case 30 stores according to a condition the contents of claims and inquiries from a customer about actual occurrences on a certain object. The configuration in the case 30 may be in an ordinary text form which is understood by a person even if a computer cannot understand it. And, this invention does not specify a storage location of cases. The case 30 may be stored as a file in the file system, or one case may be stored as one record of the database under the database management system.

A related link 40 is a pointer between a description of specific operations and situations in the script 10 related with the case 30 and a specific button switch 22 in the visual script 20.

This invention does not specify a realizing method of the related link 40, but the following two methods are generally used. In a first method, no matter whether the script 10, the visual script 20 and the case 30 are stored in a main memory or an auxiliary memory, or whether realization is made as a file system in the auxiliary memory, or whether realization is made as a record in the database management system, the related link 40 manages on the main memory or the auxiliary memory in the form of a combination of an identifier of the specific button switch 22 and an identifier of a case in the visual script 20 and a specific description in the script 10. In a second method, when the case 30 is stored in the relational database management system, a relational table for storing related links as shown in FIG. 5 is provided, and a combination of an identifier of a certain case and an identifier of the specific button switch 22 in the visual script 20 or a specific description in the related script 10 is stored as one record. This embodiment will describe to realize the related link 40 by the first realizing method.

This invention does not specify the type of database 50 for storing the case 30. A file system may be used, or a database management system such as the relational database management system may be used.

A case storage control section 60, when a retriever designates the specific button switch 22 in the specific visual script 20 or a specific operation and situation description in a specific script 1 in order to define and store a new case, defines the related link 40 between them, and stores the new case into the database 50. If the relational database management system is used as the data base 50, an SQL language "INSERT sentence" is issued to store the case 30 as a new record.

Figure 2:
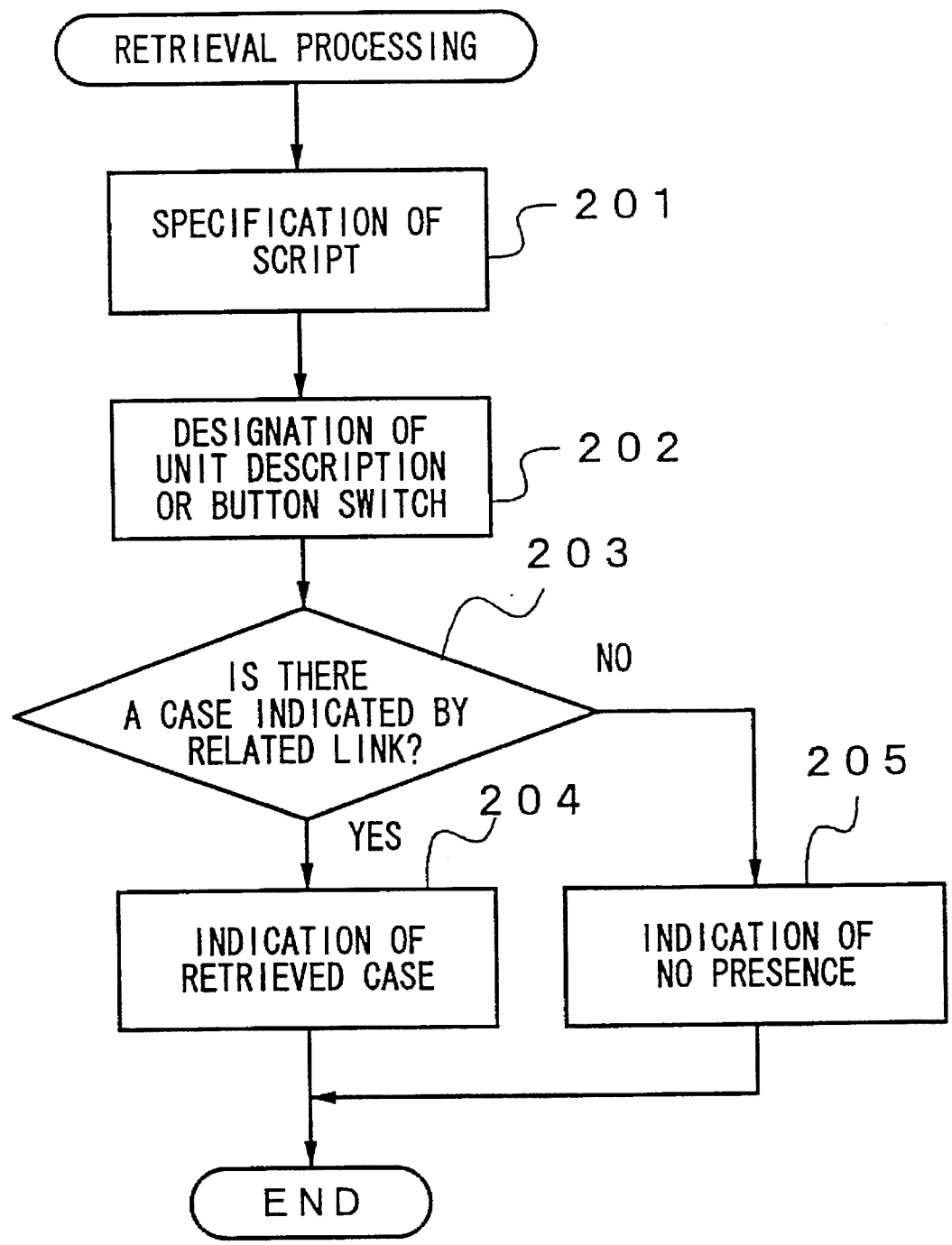
FIG. 2 is a flowchart describing a retrieval processing by the case retrieval section according to a first embodiment.

A case retrieval section 70 retrieves the case 30 of the database 50 on the basis of the script 10. A retrieval processing of the case retrieval section 70 will be described with reference to the flowchart of FIG. 2. The case retrieval section 70 first specifies a script according to an inquiry (step 201). Further, it designates a specific operation and situation description in the specific script 10 or a specific button switch in a specific visual script 2 (step 202).

It is retrieved whether a case indicated by the related link 40 affixed to a button switch and a designated operation and situation description is present in the database 50 (step 203). If the case is present, the retrieved case is indicated (step 204). If the indicated case is not present, it is indicated that the case is not present (step 205). When the relational database management system is used as the database 50, an SQL "SELECT-FROM-WHERE sentence" is issued to retrieve a case.

Phases using this invention are roughly classified into an object knowledge definition phase, a case storage phase, and a case retrieval phase. The object knowledge definition phase includes the definition of the script 1 and the visual script 2, and when developing the case database system, it is generally made by object experts. And the case storage phase, when an inquiry or claim from a user is a quite new type which has not been seen before, is a process conducted to store it as a case 30 in the database 50. At this time, the case storage control section 60 is used, and the related link 40 is stuck, but this work is generally made by an operator who receives claims and inquiries from users. And, the case retrieval phase, when claims or inquiries are made by users and responses are given to them, corresponds to the retrieval of the past similar cases 30 for reference, and a case retrieval section 7 is used at this time. This work is generally made by an operator who receives claims and inquiries from users.

As described above, according to the first embodiment, the retrieval can be made, according to a demand expressing method of a user, from a collection of cases representing condition changes with time and cases representing a relational condition of components, there is an effect that a case meeting the demand of the user can be swiftly retrieved.

Figure 3:
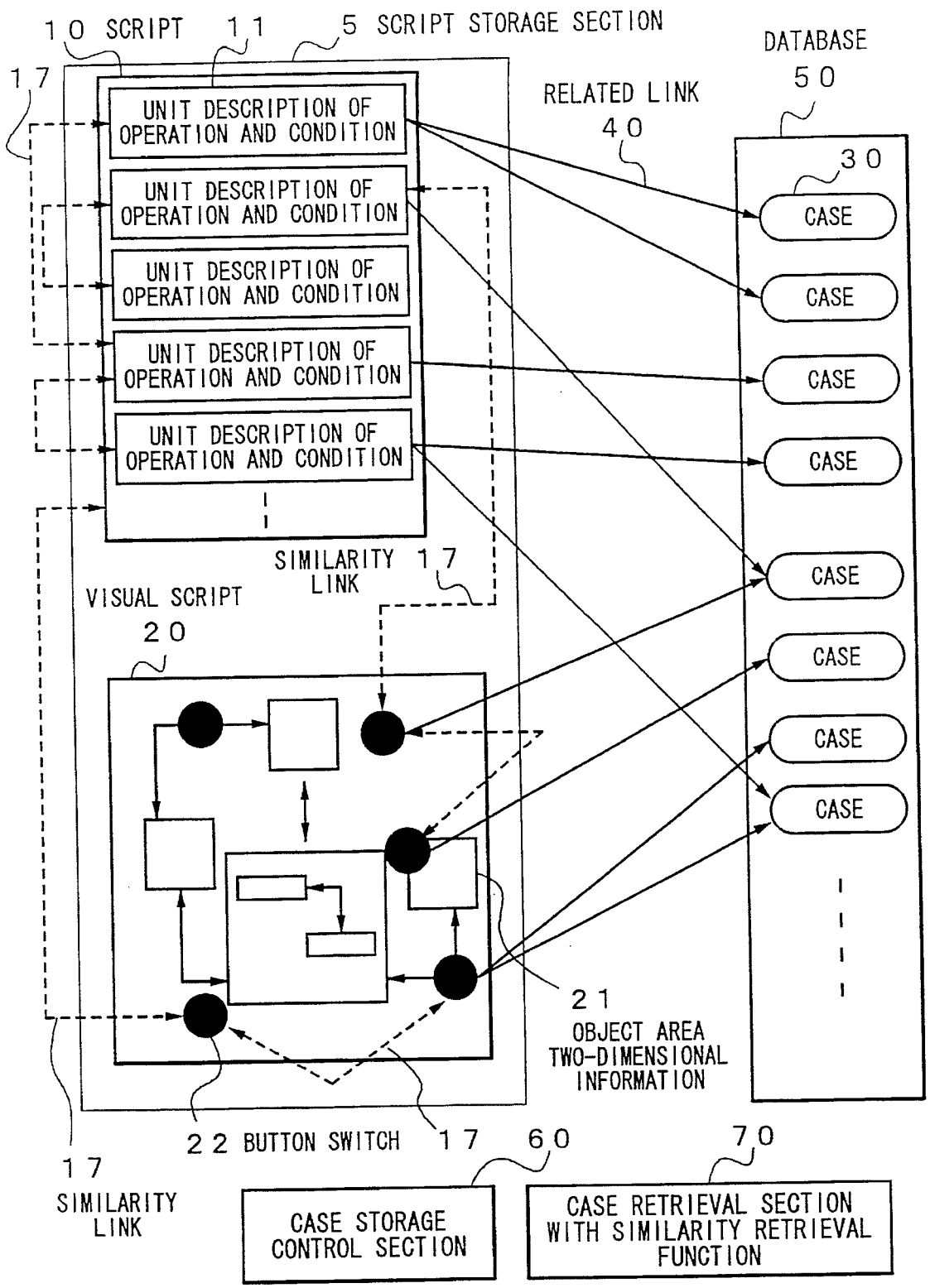
FIG. 3 is a block diagram showing a configuration of the case database storage/retrieval system according to a second embodiment.

Now, the case database storage/retrieval system according to the second embodiment of the invention will be described with reference to FIG. 3. The second embodiment adds a similarity retrieval function to the above first embodiment to improve a retrieval capacity. In FIG. 3, like reference numerals are given to the same parts as in the configuration of FIG. 1.

In FIG. 3, reference number 17 is a similarity related link with a similarity value which defines a closeness in meaning between a unit description of operations and situations in a given script, between scripts, between a script and the operations and situations in a specific script, between button switches in a given visual script, between visual scripts, between a visual script and a button switch in a specific visual script, and between the operations and situations in the script and the button switch in the visual script. In this case, an object expert gives "0" when two similarity values are same, "1" when very similar, and "2" when slightly similar, according to the object. It is arbitrary how to determine the content of a similarity value.

Figure 4:
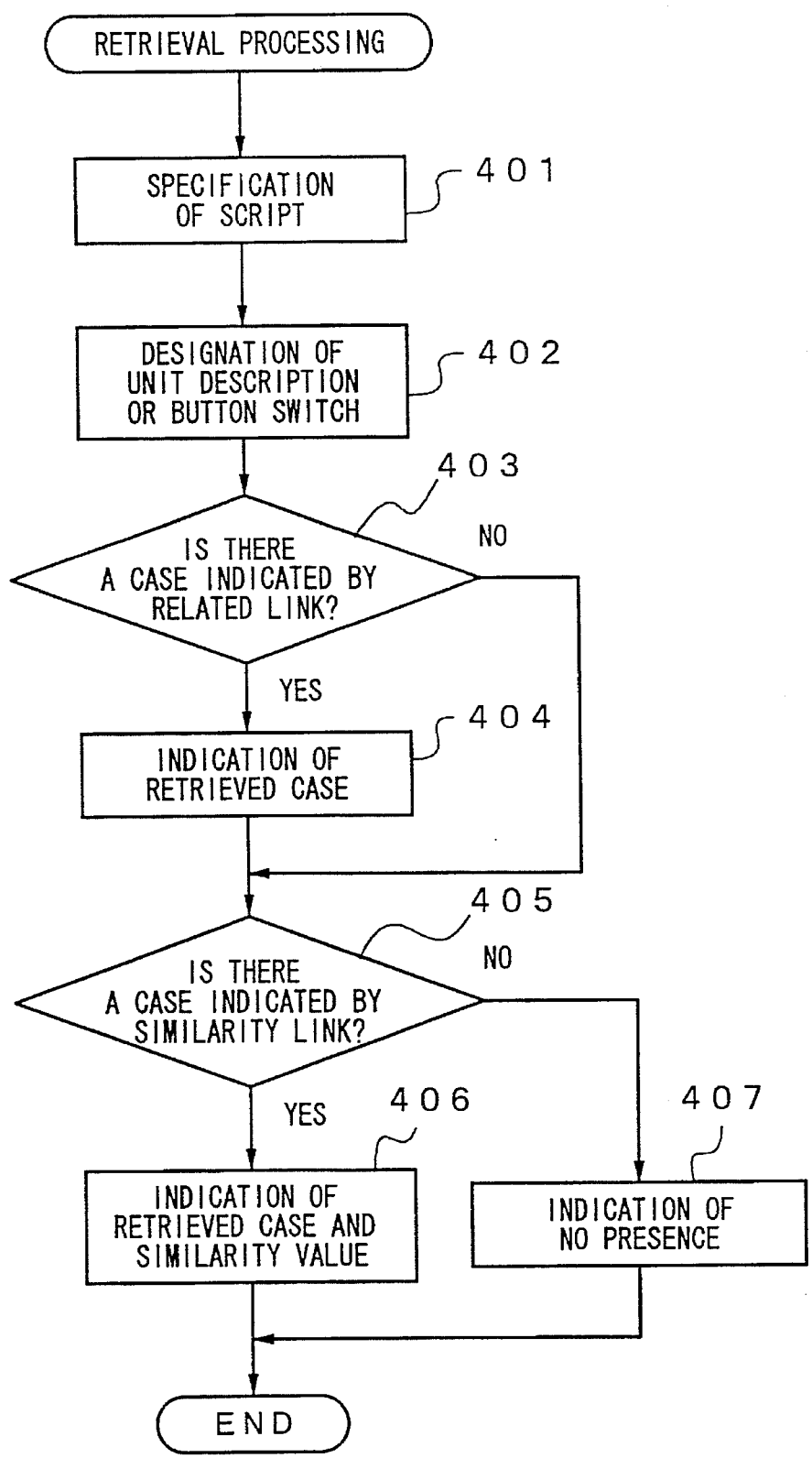
FIG. 4 is a flowchart describing a retrieval processing by the case retrieval section having a similarity retrieval function according to a second embodiment.

In this embodiment, instead of the case retrieval section 70 of the first embodiment, a case retrieval section 80 provided with a similarity retrieval function which has a case retrieval function by the above similarity related link 17 with a similarity value is provided. A retrieval processing of the case retrieval section 80 provided with a similarity retrieval function is shown in the flowchart of FIG. 4. The case retrieval section 80 provided with a similarity retrieval function first specifies a script according to an inquiry (step 401). Further, it designates a description of specific operations and situations in the specific script 10 or a specific button switch in the specific visual script 20 (step 402). It is retrieved whether a case indicated by the related link 40 stuck to the button switch and the designated operation and situation description is present in the database (step 403). When there is a case, the retrieved case is indicated (step 404).

When there is a similarity link 170 having a similarity value is present on the button switch and the designated operation and situation description, it is retrieved if there is a case which is indicated by the related link 40 stuck to the button switches in the visual script 20 and the operation and situation description in the script 10 at the destination after tracing the link (step 405). When there is a case, the retrieved case 30 is indicated together with the similarity value of the similarity link 170 having a similarity value (step 406). When there is not a case to be indicated, it is indicated that there is not a case (step 407).

Used phases are roughly classified into an object knowledge definition phase, a case storage phase, and a case retrieval phase. The object knowledge definition phase defines the script 10, the visual script 20, and the similarity link 170 having a similarity value. This phase is generally conducted by an object expert when developing the case database system.

When a claim or inquiry from a user is quite new which has not been seen before, the case storage phase is used to store it as a case 30 in the data base 50. This process is realized by the case storage control section 60, and the related link 40 is connected. This work is generally made by an operator who receives claims and inquiries from users. And, the case retrieval phase, when claims or inquiries are made by users and responses are given to them, corresponds to the retrieval of the past similar cases 30 for reference, and a case retrieval section 80 is used at this time.

According to the second embodiment, even if there is no case which completely meets the demand of a user, a similar related case can be swiftly retrieved.

Figure 6:
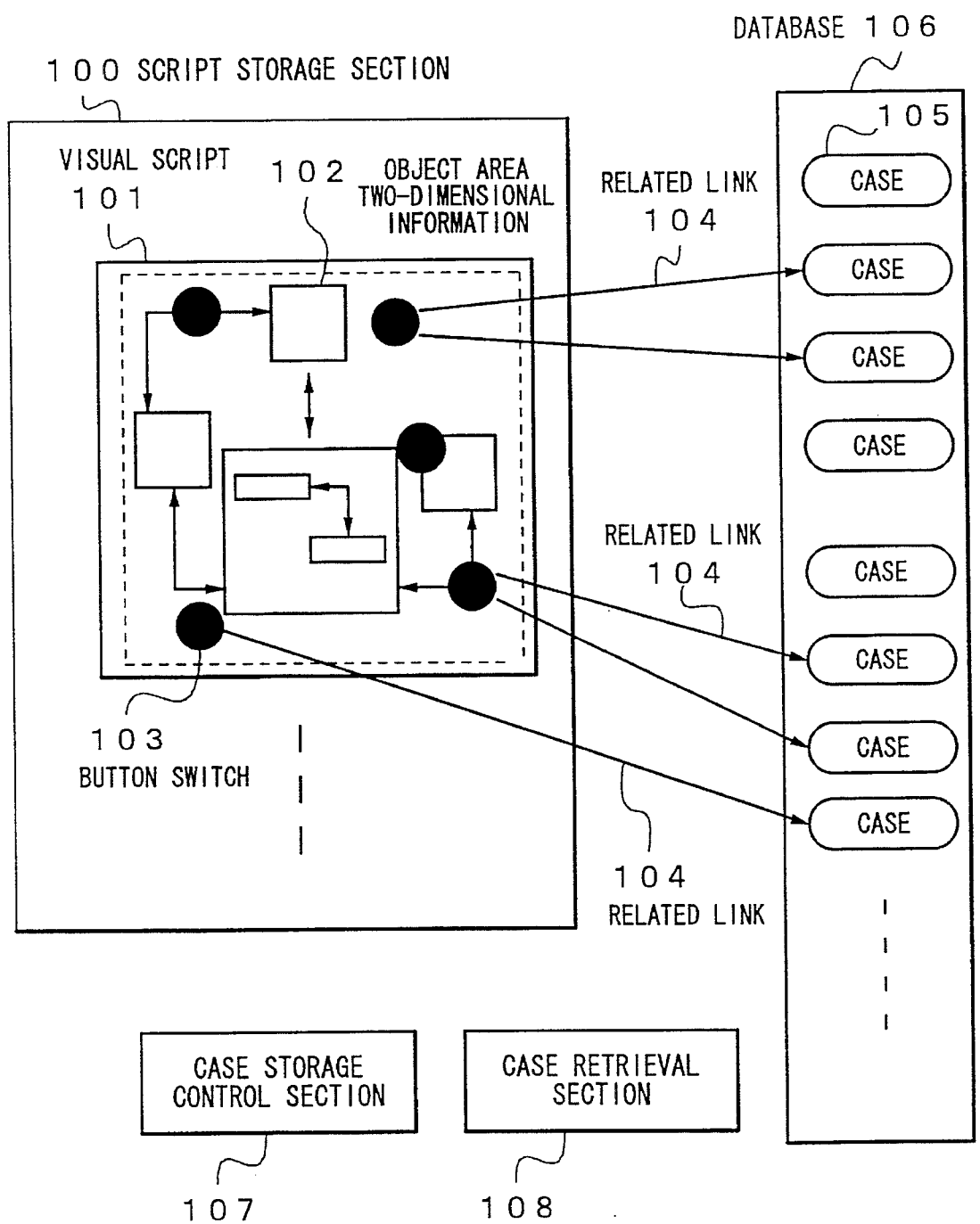
FIG. 6 is a block diagram showing a configuration of the case database storage/retrieval system according to a third embodiment.
Figure 7:
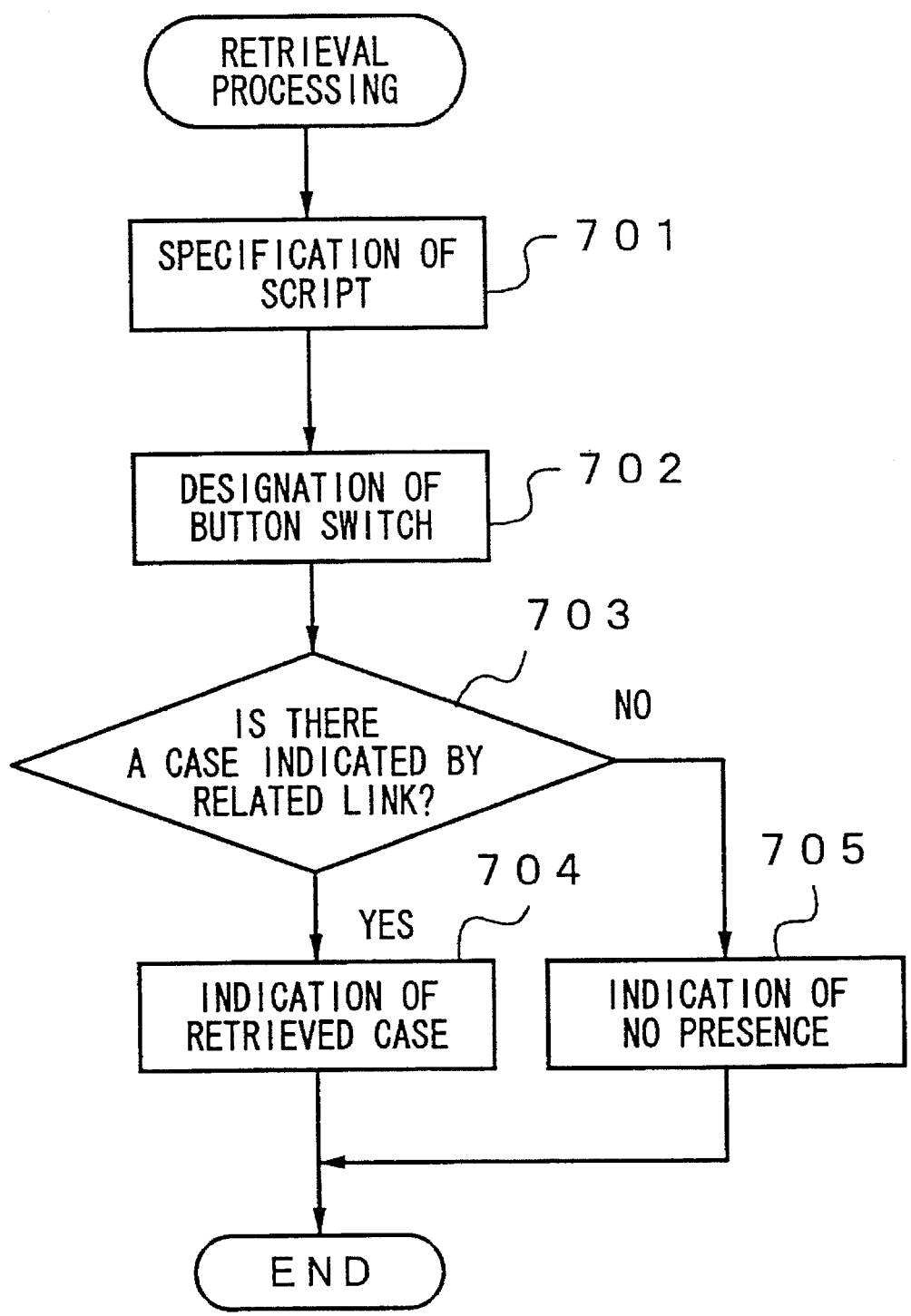
FIG. 7 is a flowchart describing a retrieval processing by the case retrieval section according to a third embodiment.
Figure 16:
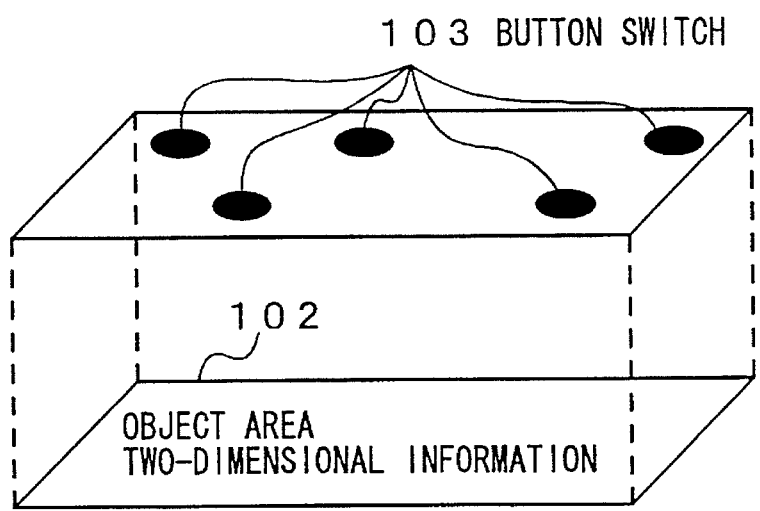
FIG. 16 is a diagram three-dimensionally representing the script of a third embodiment.

Now, the case database storage/retrieval system according to the third embodiment of the invention will be described with reference to FIG. 6. In FIG. 6 which shows the third embodiment, a visual script 101 is stored in a script storage section 100. The visual script 101 comprises object two-dimensional information 102 which two-dimensionally represents knowledge and information concerning an object, and button switches 103 arranged on it. FIG. 16 shows the visual script 101 three-dimensionally. In FIG. 16, the button switches 103 are disposed on the object two-dimensional information 102. The visual script 102 is present in the number appropriate to represent the object.

For example, when condition and operation situation descriptions variable with time have a significant meaning, one visual script 101 is represented for each collection of typical time flows and processing steps. For example, scripts concerning an electronic mail in terms of time are assumed to include a script "to send a mail", a script "to receive a mail", a script "to transfer a mail", a script "to upload a local file when sending a mail", and a script "to download into a local file the contents of a mail which is being received." As a specific example of the script contents, in the script "to send an electronic mail", it is desirable that the object two-dimensional information 102 describes time series as follows. This is preferred to be represented by image information, so that it is not particularly required to be a text.

1. Indicates a sub-menu.
2. Selects "to send a mail."
3. Designates a destination address.
4. Inputs the body.
5. Checks the content.
6. Sends.

Figure 12:
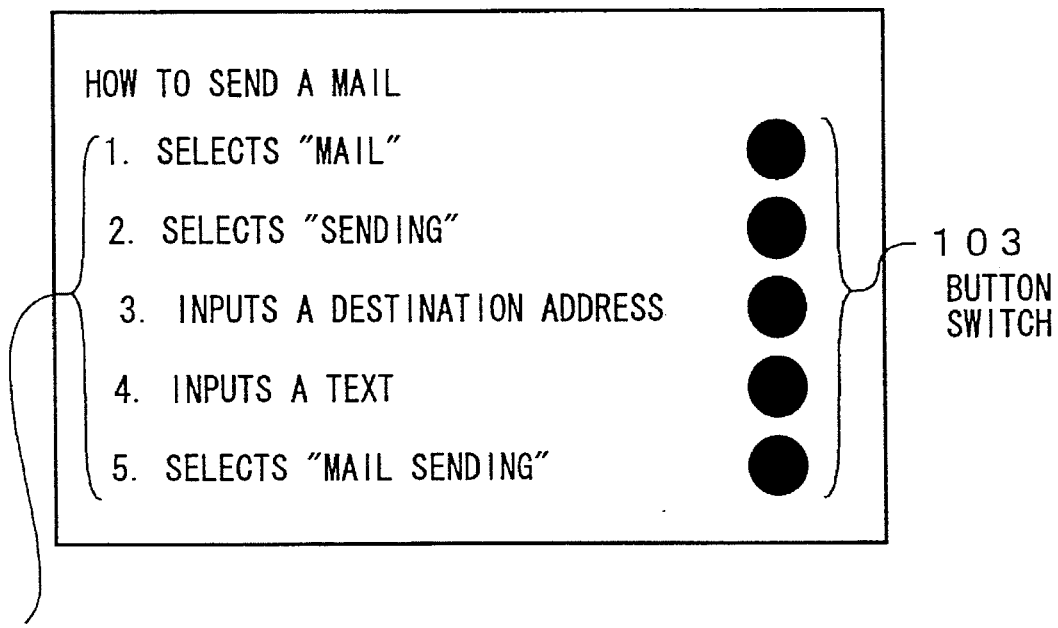
FIG. 12 is a diagram showing an example of visual script representing changes of conditions and operations with time.

And, the button switches 103 are preferably arranged next to the itemized time series. FIG. 12 shows an example of the visual script 102 having the above time series.

Figure 13:
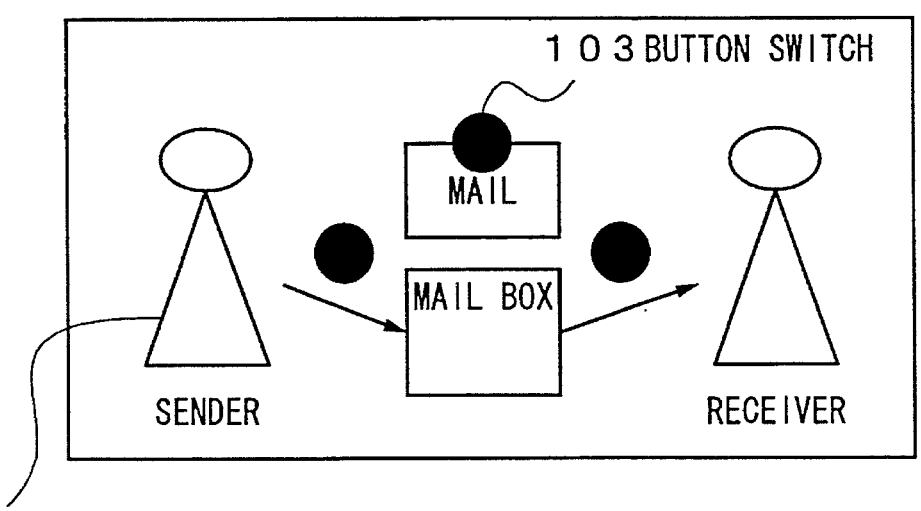
FIG. 13 is a diagram showing an example of visual script representing relational expressions of object components.

When the relation of components which configure an object has a significant meaning, the scripts are provided in the number corresponding to that of the typical structure. If the object is a case of an inquiry concerning a specific "electronic mail", the sender's terminal, the sender's modem, telephone line, telephone receiver on the host side, the host's mailbox, the mail interpreting program in the host, the receiver's terminal, the receiver's modem, and telephone line are represented as the components (object two-dimensional information 102), and an image, in which lines representing a flow of data and control among them connect the components, makes one spatial script. FIG. 13 shows an example of this spatial script.

Figure 14:
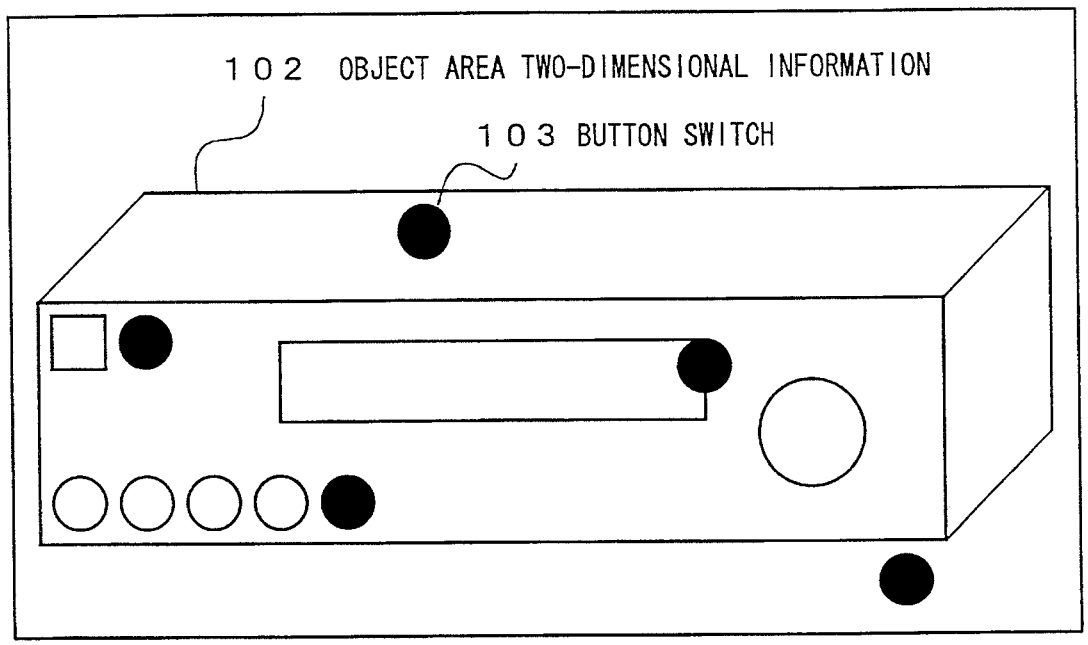
FIG. 14 is a diagram showing an example of visual script representing object photographic image information.

When object photographic image information has a significant meaning, the scripts are provided in the number corresponding to that of the object typical image information. For example, when a device such as a video reproducing device is an object, a separate script may be provided for a photographic image seen from the front of the video reproducing device, a photographic image seen from above, and a photographic image seen from side. FIG. 14 shows an example of the script of the above photographic images.

Figure 15:
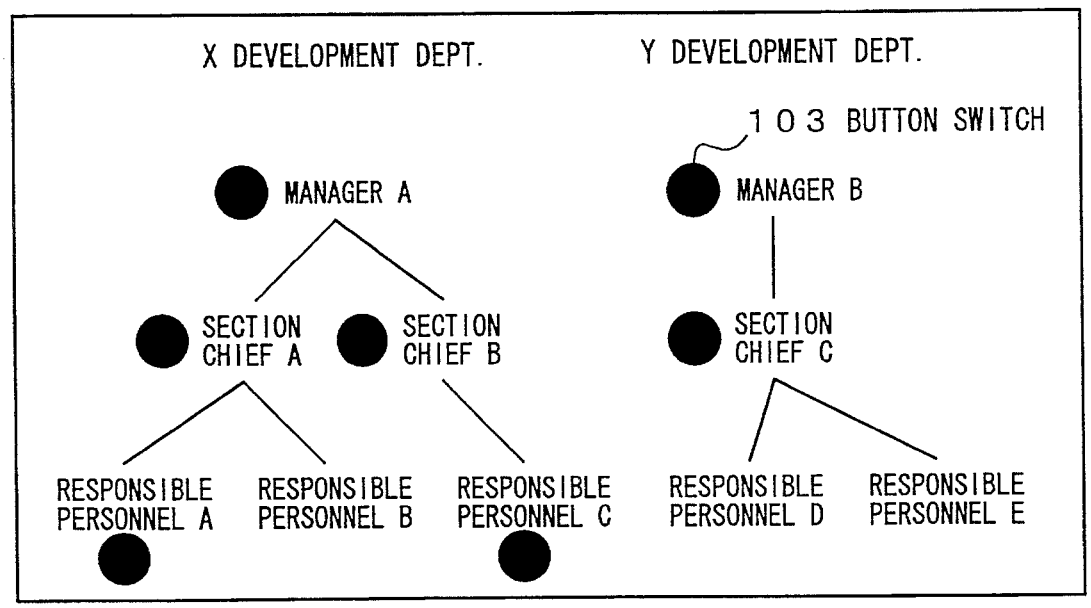
FIG. 15 is a diagram showing an example of visual script representing organizational information.

When an object organizational expression has a significant meaning, the scripts are provided in the number corresponding to that of the object organizational relations. For example, when the organizational relation of a specific company is an object, an image of its organization chart may become one script. FIG. 15 shows an example of such an organizational script description.

It is to be understood that the object two-dimensional information 2 is not limited to the above. It may be any type as long as it is significant image information as a key for retrieval when retrieving a case concerning a specific object.

A case 105 stores, according to the situation, the contents of claims and inquiries from customers which have actually occurred in connection with a certain object. The configuration within the case 105 may be generally in an ordinary text form whose content can be understood by a man.

A related link 104 is a pointer between the case 105 and the button switch 103 in the visual script 101 which relates to the case 105 in terms of meaning.

Database 106 storing the case 105 is in the same type as the database 50 of the first embodiment of FIG. 1.

When a retriever designates a specific button switch 103 in the specific script 1 to define and store a new case, a case storage control section 107 defines the related link 104 between them, and stores the new case 105 in the database 106. Connection information between the case 105 and the button switch 103 is stored in the table as shown in FIG. 11.

A case retrieval section 108 retrieves the case 105 according to the script 101. The retrieval processing by the case retrieval section 108 first specifies the visual script 101 (step 701), and designates a specific button switch 103 in the specific script 101 (step 702).

It is retrieved whether the case 105 indicated by the related link 104 stuck to the designated button switch 103 is present in the database 106 (step 703). If the case 105 is present, the retrieved case 105 is indicated (step 704). If the indicated case 105 is not present, it is indicated that it is not present (step 705).

The process of effecting a specific operation by depressing a button on the display is a very ordinary function in ordinary graphic user interface (MicrosoftWindows, Intervlews, X, etc.).

The phases using this invention are roughly classified into an object knowledge definition phase, a case storage phase, and a case retrieval phase. The object knowledge definition phase defines the script 101, but this is generally conducted by an object expert when developing the case database system. And, when a claim or inquiry from a user is a quite new one which has never been received before, the case storage phase is a process to store it as a case 105 in the database 106. This process is realized by the case storage control section 107, and the related link 104 is disposed. This work is generally conducted by an operator who receives claims and inquiries from users. And, the case retrieval phase, when claims or inquiries are made by users and responses are given to them, corresponds to the retrieval of the past similar cases 105 for reference, and a case retrieval section 108 is used at this time. This work is generally conducted by an operator who receives claims and inquiries from users.

As described above, according to the third embodiment, since the retrieval can be made on appropriate cases by an appropriate method, according to a demand expressing method of a user, from a collection of cases including a condition and operation change with time, a relational expression of object physical components, object photograph information, and organizational information, a case meeting the demand of the user can be swiftly retrieved.

Now, the case database storage/retrieval system according to the fourth embodiment will be described with reference to FIG. 8. In the fourth embodiment, a similarity retrieval function is added to the third embodiment to improve a retrieval capacity. The fourth embodiment has a case retrieval section 118 with the similarity retrieval function which has a case retrieval function by a similarity link 119 with the above similarity value in addition to the retrieval of a case by the related link 104, instead of the case retrieval section 108 of the third embodiment, and the quite same other components. In the fourth embodiment, like reference numerals are used for the same components as in the third embodiment.

Figure 8:
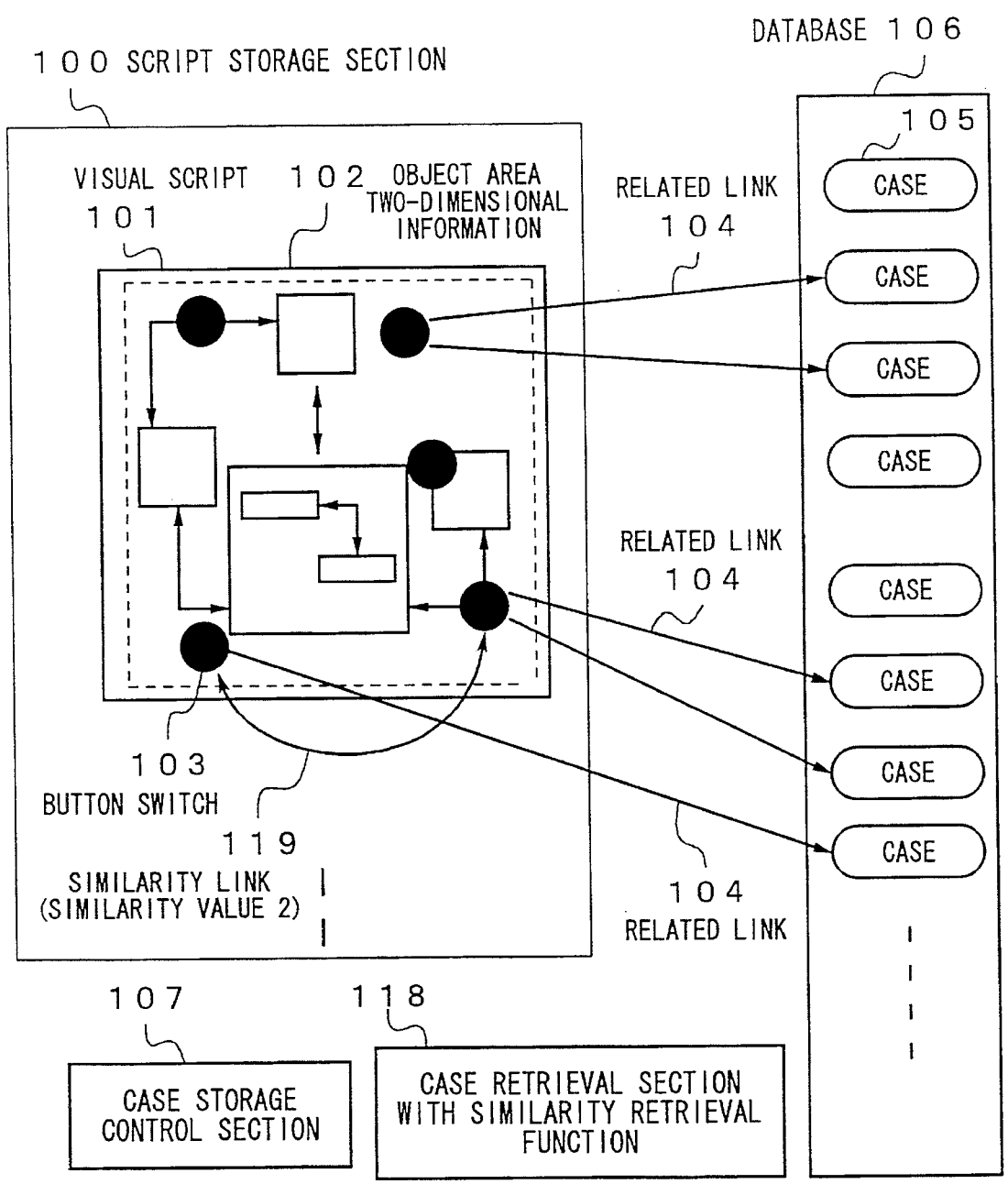
FIG. 8 is a block diagram showing a configuration of the case database storage/retrieval system according to a fourth embodiment.

In FIG. 8, a dotted line 119 is a similarity link with the above similarity value defining a closeness in terms of meaning between given button switches in a specific script. As to the similarity value, when two inquiries are same, it is defined to be "0", when they are very similar, it is defined to be "1", and when they are slightly similar, it is defined to be "2". This similarity value is given by an object expert depending on an object.

Figure 17:
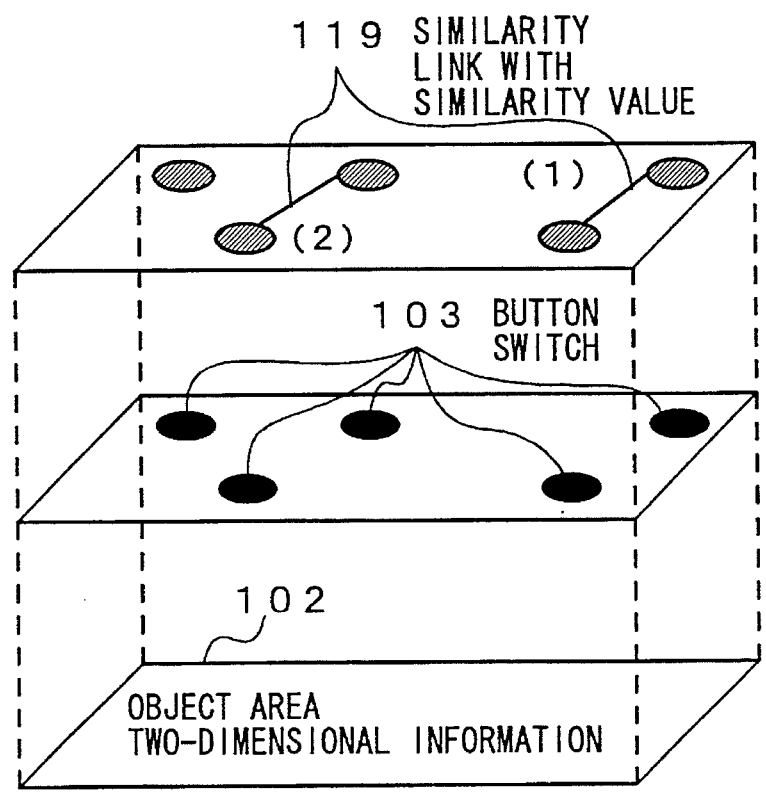
FIG. 17 is a diagram three-dimensionally representing the script of a fourth embodiment.

When the script 101 of the fourth embodiment is three-dimensionally expressed, it can be expressed as shown in FIG. 17. FIG. 17 is formed by adding one definition of the similarity link 119 with a similarity value on the top of FIG. 16. The definition of the similarity link 119 with a similarity value connects different button switches 103.

Figure 9:
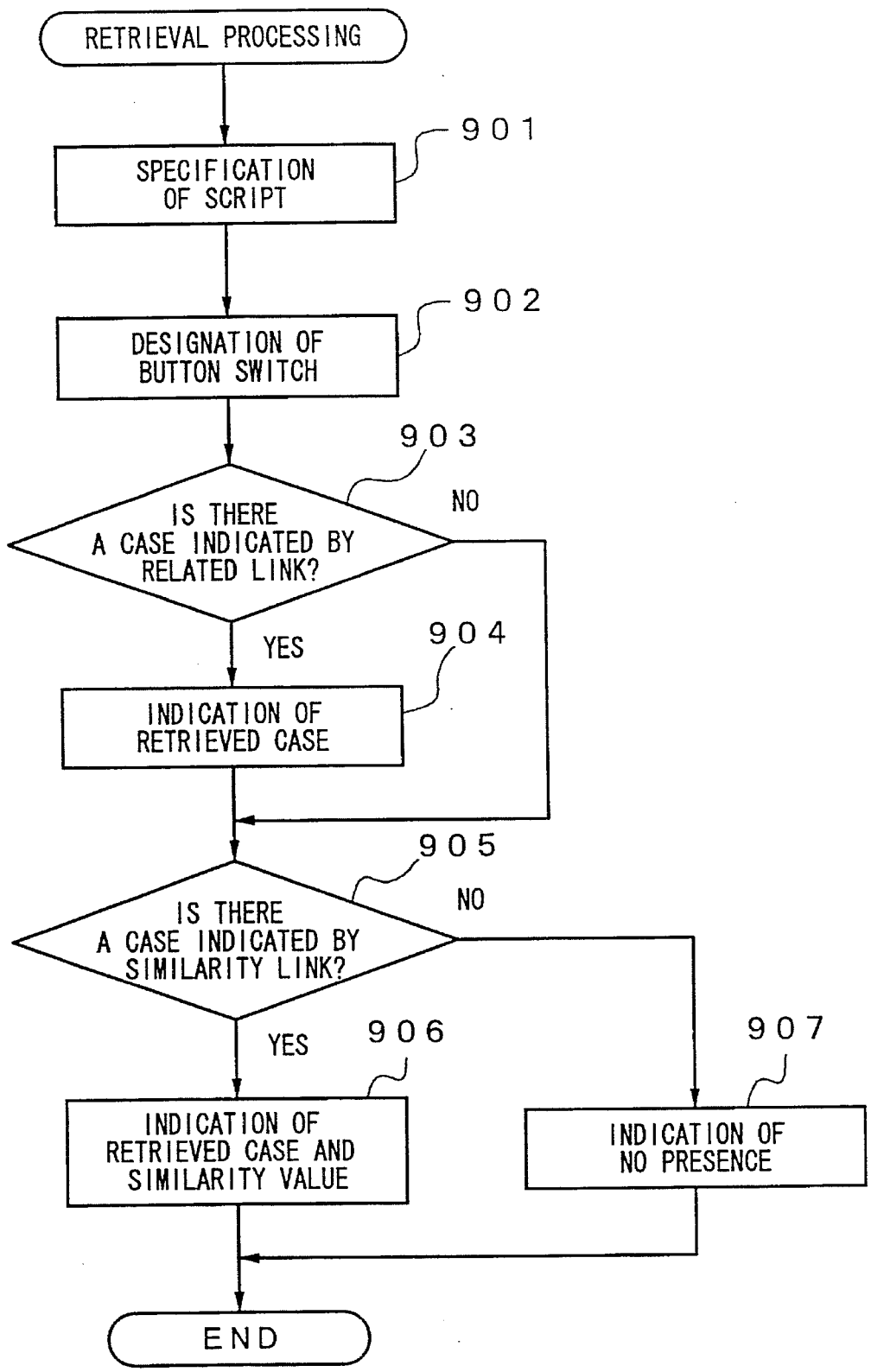
FIG. 9 is a flowchart describing a retrieval processing by the case retrieval section having a similarity retrieval function according to a fourth embodiment.

The case retrieval section 118 with the similarity retrieval function first specifies a script according to an inquiry as shown in the flowchart of FIG. 9 (step 901). Furthermore, when a given button switch 103 in a specific script 101 is designated (step 902), it is retrieved whether a case which is indicated by the related link 104 stuck to the designated button switch 103 is present (step 903). If the case is present, the retrieved case is indicated (step 904).

And, when the designated button switch 103 is examined, and if the similarity link 119 with a similarity value is present, it is retrieved whether there is a case which is indicated by the related link 104 stuck to the button switch 103 at the destination found by tracing the link (step 905). If there is the case, the retrieved case 30 is indicated together with the similarity value of the similarity link 119 with a similarity value (step 906). If there is not the indicated case, it is indicated that there it is not present (step 907).

The phases using the fourth embodiment are roughly classified into an object knowledge definition phase, a case storage phase, and a case retrieval phase, in the same way as the specification phase of the invention in the third embodiment. But, there is an additional work to define the similarity link 119 with a similarity value by the object knowledge definition phase.

In addition to the effects of the third embodiment, the fourth embodiment can swiftly retrieve a similar related case, even if there is not a case which completely meets the demand of a user.

Figure 10:
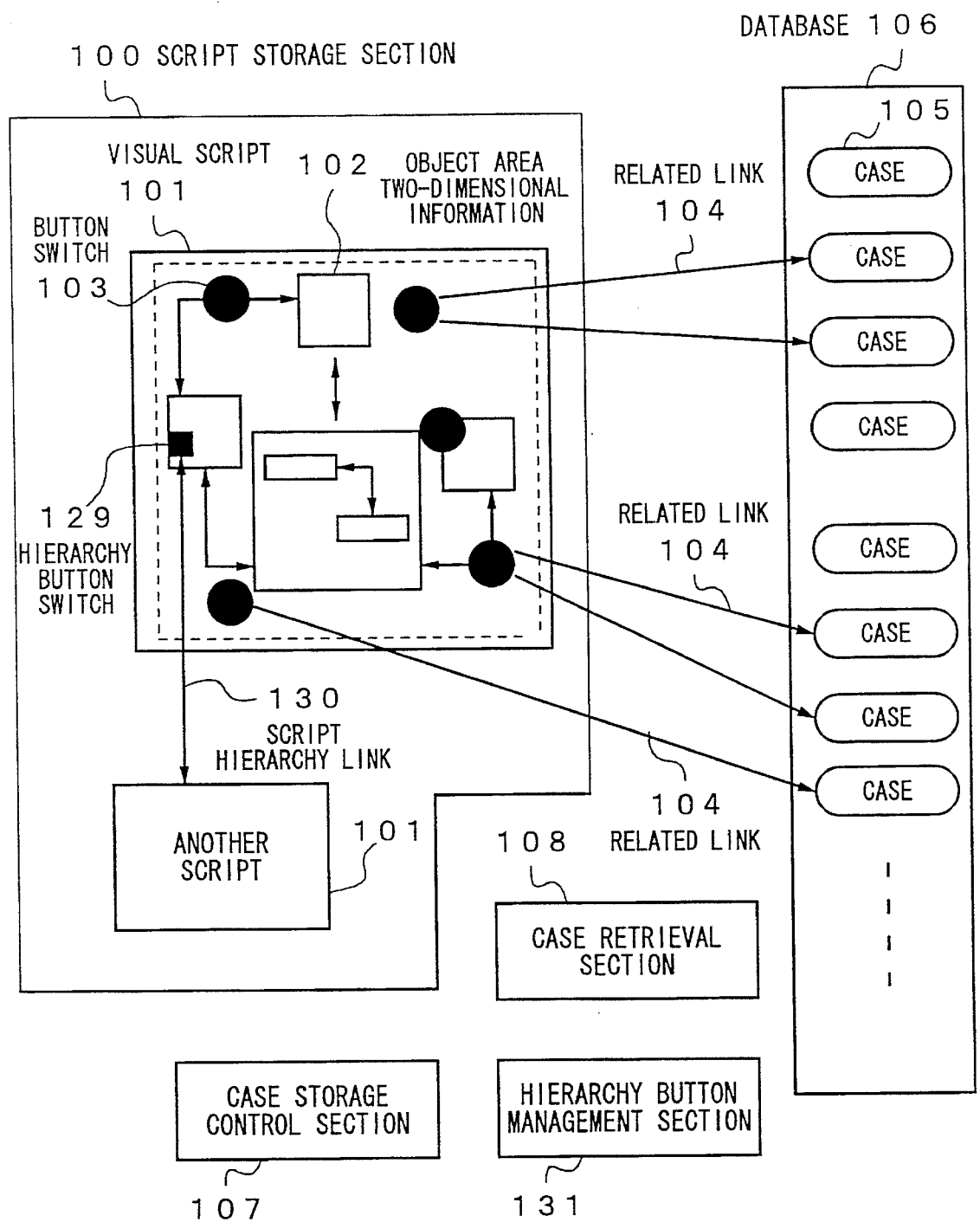
FIG. 10 is a block diagram showing a configuration of the case database storage/retrieval system according to a fifth embodiment.

Now, the case database storage/retrieval system according to the fifth embodiment will be described with reference to FIG. 10. The fifth embodiment has its retrieval capacity improved by adding the hierarchy expression function of the visual script to the third embodiment. In the fifth embodiment, like reference numerals are used for the same components as in the third embodiment. Different configurations will be described below.

Reference numeral 129 is a hierarchy button switch. The hierarchy button switch 129 can be disposed in given numbers at desired positions in a specified visual script 101.

Reference numeral 130 is a script hierarchy link. The script hierarchy link 130, when a designer designates the hierarchy button switch 129 and a specific script, connects them together. When the hierarchy button switch 129 is depressed by a retriever, and if there is the script hierarchy link 130, the visual script connected by it is shown on the display. Reference numeral 131 is a hierarchy button management section, which detects an event (depression) when the hierarchy button switch 129 is depressed by a user, and when there is another script which is connected to the hierarchy button switch 129 by the script hierarchy link 130, it is shown on the display. When there is not another script, nothing is done. This process is a very general function for an ordinary graphic user interface (MicrosoftWindows, Intervlews, X, etc.).

Figure 18:
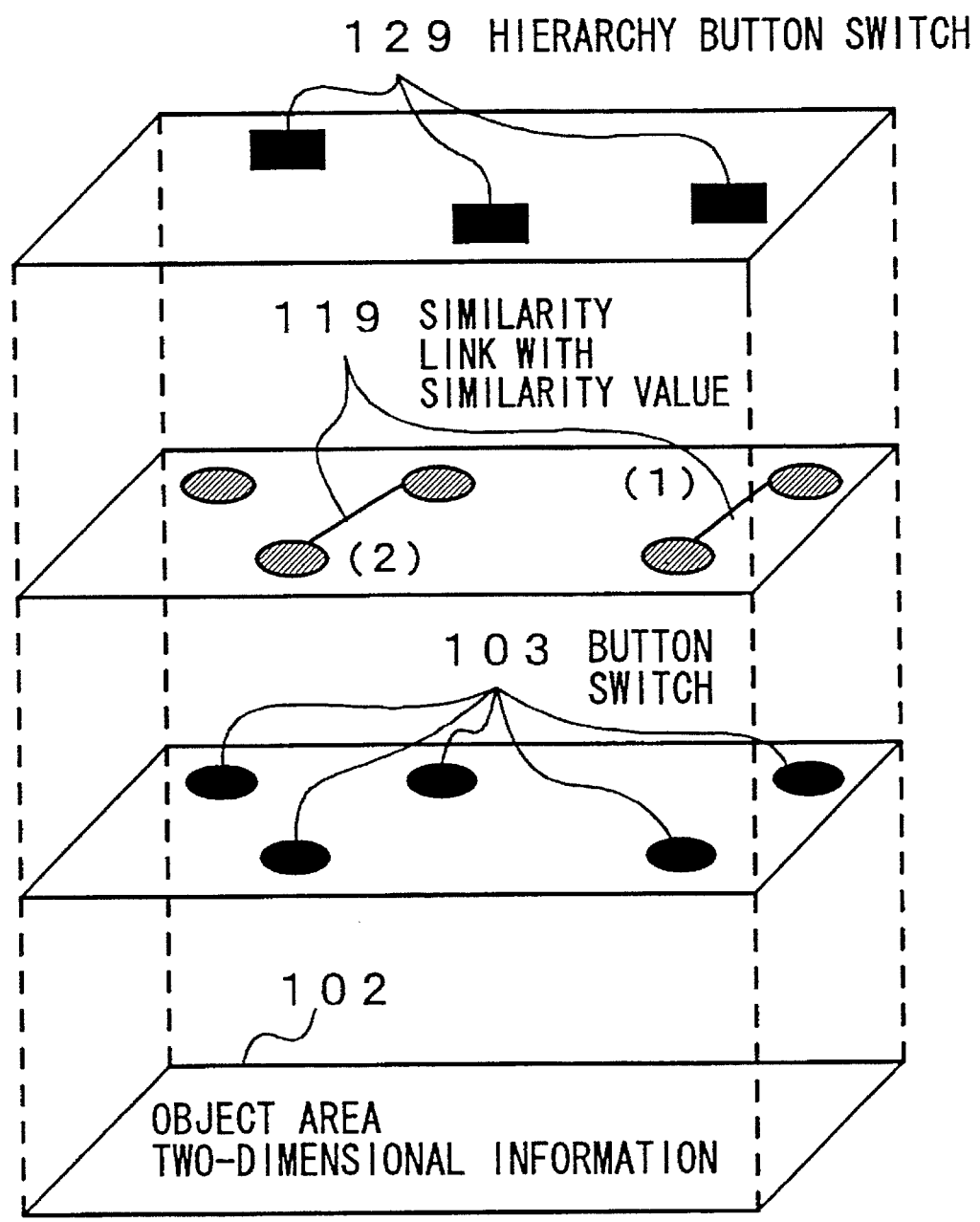
FIG. 18 is a diagram three-dimensionally representing the script of a fifth embodiment.

The visual script 101 of the fifth embodiment can be three-dimensionally expressed as shown in FIG. 18. FIG. 18 is formed by adding one definition of the hierarchy button switch 129 on the top of FIG. 17.

The phases using the fifth embodiment are roughly classified into an object knowledge definition phase, a case storage phase, and a case retrieval phase, in the same way as the specification phase of the third embodiment. There is an additional work to define the hierarchy button switch by the object knowledge definition phase. And, the case storage phase and the case retrieval phase may add a work to refer to another script while depressing the hierarchy button switch. In addition to the effects of the third embodiment, the fifth embodiment is effective to retrieve many cases because the hierarchy expression of scripts can be easily made.

The case database storage/retrieval system according to the sixth embodiment will be described.

General questions and inquiries from customers often express, "When I conducted X, the machine responded as Y. And, when I tried to conduct Z, there was no response." This means that when a customer was operating toward a certain target concerning an object, his operation was correct up to a certain point but made an error there. The target assumed by the customer can be predicted in advance if an object has been determined.

Generally, a script which organizes a treating process (operation and condition) for an object can be prepared in advance for each assumed target of the customer. Since the assumed target of the customer is generally present in plural, it is necessary to provide a plurality of scripts. And, when there are a plurality of typical processes to accomplish the same assumed target, it is necessary to provide a plurality of scripts for the same assumed target.

Inquiries and claims on an object by customers seem to be due to a cause that operation was correct up to a certain point according to a typical procedure but fell outside the procedure on the way. In other words, a case that the operation could not be done correct is a departure from a typical process. Therefore, when the inquiries and claims from customers are stored as cases by relating to the operations and conditions of the scripts that they have occurred, retrieval can be made easily in another case. Therefore, in view of specific operations and conditions in the scripts, reference links are related as an index to specific cases.

When a customer makes an inquiry, a responding operator listens to an assumed target of the user, searches a script which corresponds to a typical process for dealing with a target intended by the customer, hears the actually done operations and conditions from the customer, and traces the process in the script. The operator asks the user if he made on the way an operation contradictory to or different from the operation and condition written in the script, designates the operation and condition present in the script corresponding to the operation and condition made by the customer, and directs the retrieval of the case management database to find if there is a relevant case. If there is an applicable case, it is immediately indicated to the operator, so that the operator can respond to the user's inquiry.

Figure 19:
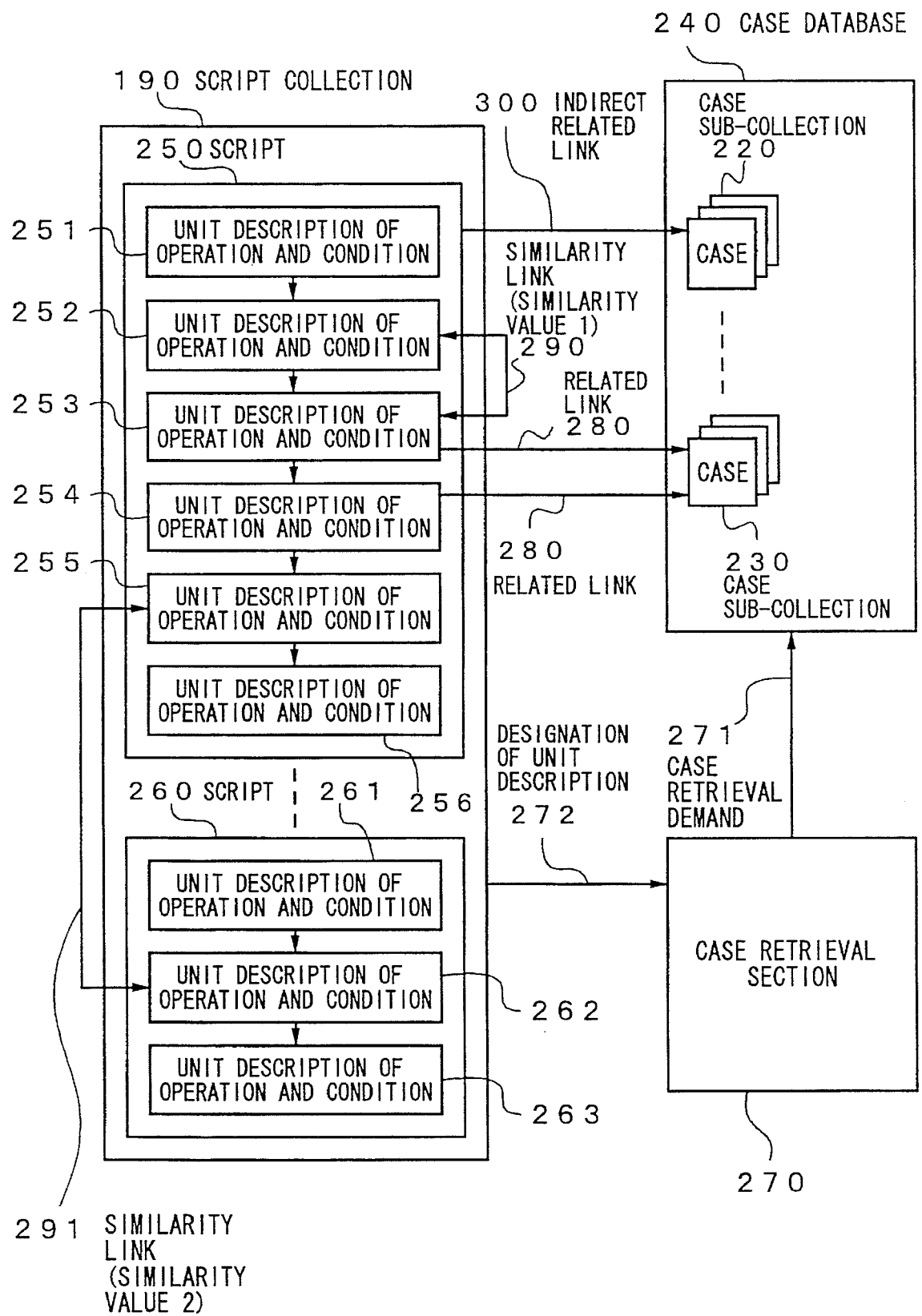
FIG. 19 is a block diagram showing a configuration of the case database storage/retrieval system according to a sixth embodiment.

A configuration of the case database storage/retrieval system according to the sixth embodiment will be shown in FIG. 19. This case database retrieval system is provided with a case database 240 which includes case sub-collections 220 and 230 collecting actually occurred cases according to situations. And, it has a script collection 190 which includes a script 250 arranging, in time order (stepwise order), unit descriptions 251–256 describing the operations and situations in an achievability process of the assumed target with respect to the object, and a script 260 arranging, in time order (stepwise order), unit descriptions 261–262 of different operations and situations.

The similar unit descriptions 252 and 253 contained in the same script 250 are mutually related by a similarity link 290 added with a similarity value to represent the degree of similarity. And, the similar unit descriptions 255 and 262 contained in the different scripts 250 and 260 are mutually related by a similarity link 291 added with a similarity value.

Among the unit descriptions of respective operations and situation contained in the script, a related link 280 is provided between a specific unit description and a specific case sub-collection with regard to a unit description of operations and situations related to a specific case sub-collection of the case database 240 to mutually relate them.

FIG. 19 shows that the related link 280 is present between the unit descriptions 253, 254 and the case sub-collection 230 contained in the script 250, and the unit descriptions 253, 254 are related with the case sub-collection 230.

The unit descriptions of respective operations and situations contained in the script are not directly related, but when the scripts seen as a whole are related to a specific case sub-collection (an achievability target alone to an object agrees), an indirect related link 300 is disposed between the entire script and the specific case sub-collection to relate them. FIG. 19 shows that the indirect related link 300 is positioned between the script 250 and the case sub-collection 220 to indicate that there is a little relation between the script 250 and the case sub-collection 220.

And, a case retrieval section 270 is provided to retrieve with the script of the case database 240 as an index. The case retrieval section 270 executes a case retrieval request 271 by a unit description designation 272 of the script.

Figure 20:
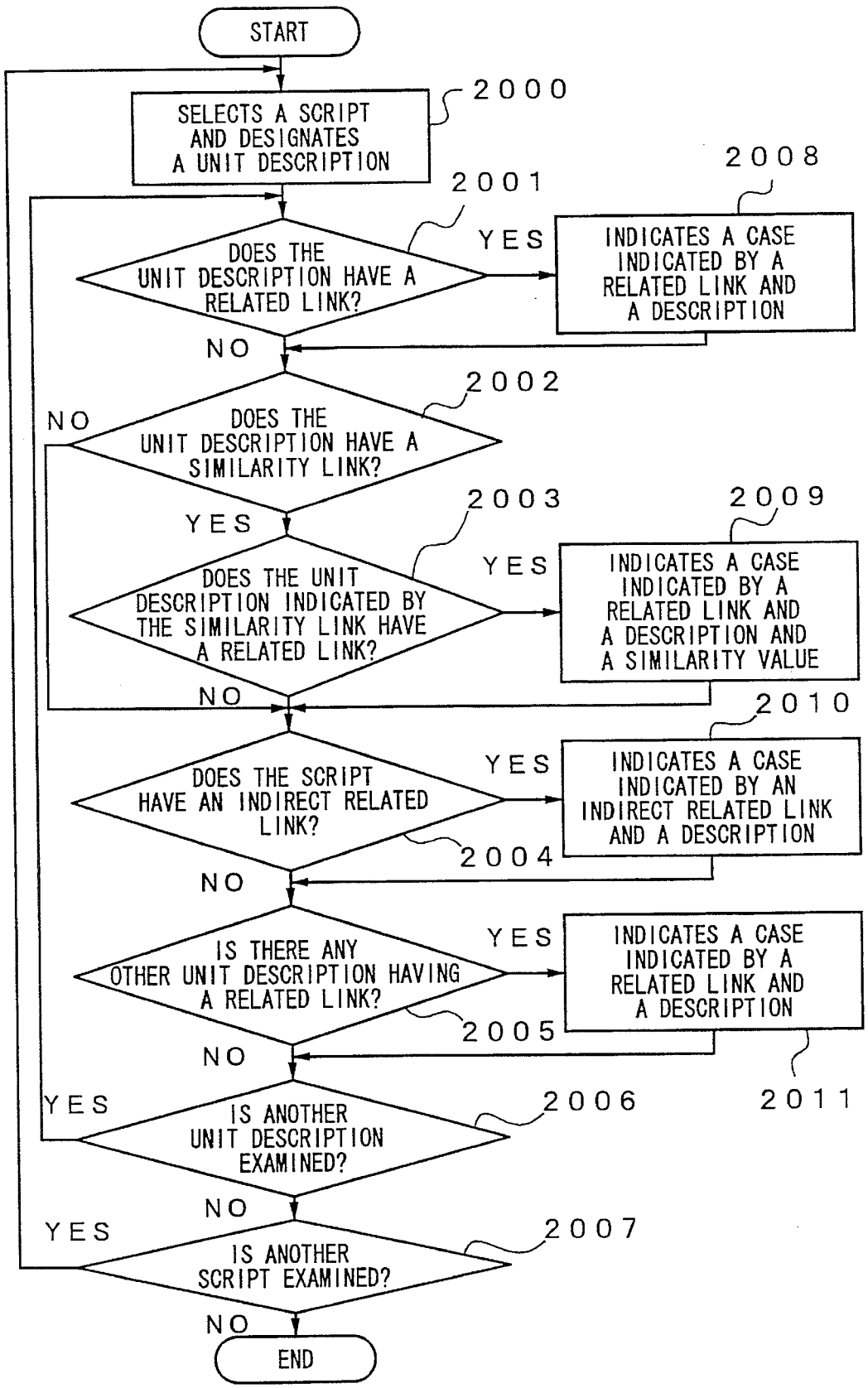
FIG. 20 is a flowchart describing a retrieval processing by the case retrieval section in a sixth embodiment.
Figures 21, 22:
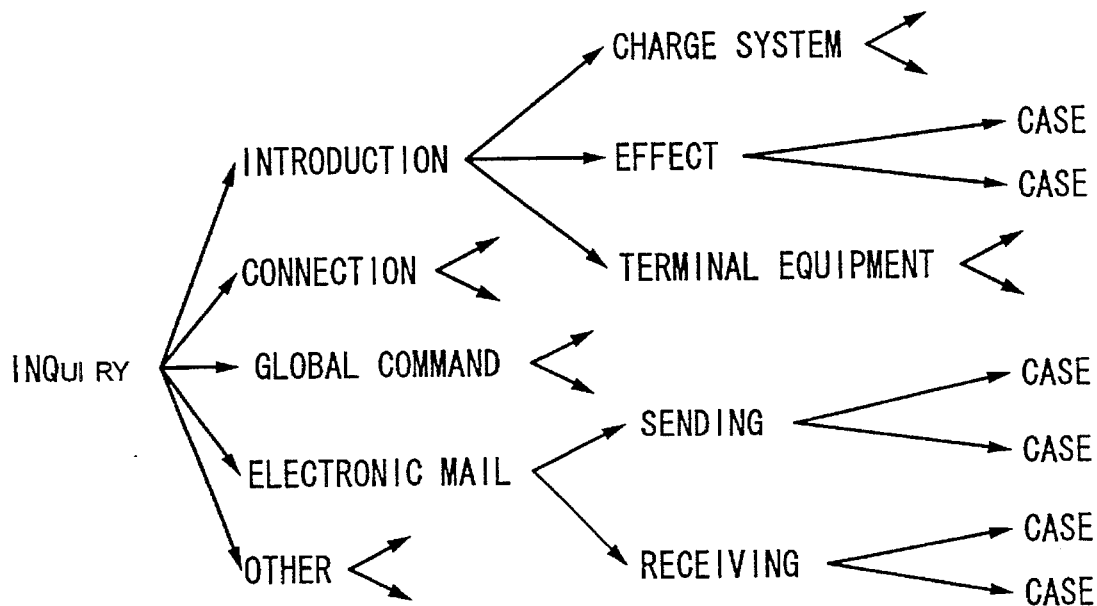
FIG. 21 is a diagram showing an example of database by a conventional hierarchy structuring.
FIG. 22 is a diagram describing an example of a conventional relational database.

A flow of operations of the case retrieval section 270 will be described with reference to FIG. 20. A specific example of retrieval by designating the unit description 251 of the script 250 will be described. When a specific script 250 shown on the display is selected and the unit description 251 of a specific script 250 is designated to request a case retrieval (step 2000), the unit description 251 of the retrieval request does not have the related link 280 (NO in step 2001) nor a similarity link 290 (NO in step 2002), and it is judged whether the script 250 of the case retrieval request has the indirect related link 300 (step 2004).

The script 250 indicates a description of having the indirect related link 300 (YES in step 2004) and a description of indicating "presence of a case corresponding" to a case (case of case sub-collection 220) shown by the indirect related link 300 (step 2010). And, since the other unit descriptions of the script 250 have unit descriptions 253, 254 having the related link 280 (YES in step 2005), a case showing the related link 280 (case of case sub-collection 230) and a description, "the script 250 may have a related case" (step 2011) are indicated (step 2011), and when other unit descriptions are retrieved, restoring is made to step 2001 (YES in step 2006).

When the unit description 252 is designated to require a case retrieval, it is judged that the related link 280 is not possessed (NO in step 2001), and that the similarity link 290 is possessed (YES in step 2002). And, since the unit description 253 pointing the similarity link 290 has the related link 280 (YES in step 2003), a case pointing the related link 280 (case of case sub-collection 239) and words showing a similarity degree added to the similarity link 290 and a description, "there is a similar case" (a similarity value "2") are indicated (step 2009).

And, it is judged that the script 250 has the indirect related link 300 (YES in step 2004), and a case pointing the indirect related link 300 (case of case sub-collection 230) and a description, "a corresponding case is present" are indicated (step 2010). Furthermore, since the unit descriptions 253, 254 having the related link 280 are present among the other unit descriptions in the script (YES in step 2005), a case pointing the related link 280 and a description, "the script may have a related case" are indicated (step 31). When other unit descriptions and other scripts are not examined (NO in step 2006 and step 2007), the process is completed.

Then, a specific example of a case retrieval request by designating the unit description 262 of the script 260 will be described. When the unit description 262 of the script 260 is designated to make a case retrieval request (step 2000), the unit description 262 does not have the related link (NO in step 2001) but has the similarity link 291 (YES in step 2002), so that the unit description 255 of the script 250 pointed by the similarity link 291 is examined.

In this case, the unit description 255 pointed by the similarity link 291 does not have the related link 280 (NO in step 2003), the script 260 does not have the indirect related link 300 (NO in step 2004), and the other unit descriptions of the script 260 do not have the related link 280 (NO in step 2005). Therefore, when other unit descriptions and scripts are not examined (NO in step 2006 and step 2007), a case is not indicated and the process is completed. In this case, it may be indicated that there is not a case, in the same way as in the other embodiments.

Although the sixth embodiment has described an example provided with the script arranging the unit descriptions 251 to 256 in time order (stepwise order) describing the operations and situation of the assumed target achieving process for the object, the visual script shown in the other embodiments can be provided. In this case, the above similarity link can be placed between the two-dimensional information of the visual script, and between the specific unit description of the script and the specific two-dimensional information of the visual script.

In the above embodiment, the operator selects a script corresponding to the target intended by the customer, according to an inquiry or claim by the customer. And, when the customer reaches an unintended target regardless of his correct operation up to the middle of the typical process shown by the unit description of the script, the operator finds the customer's unit description which falls in a typical process on the way. Then, the operator can retrieve, according to a case retrieval request designating the unit description, a case which is related by a partly agreed link or similarity link from the unit description.

According to the sixth embodiment, an appropriate case corresponding to a target can be retrieved from a collection of cases including the changes of conditions with time, based on the operation made or the condition occurred in the process for reaching the target intended by the customer.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A case database storage/retrieval system, comprising:

a database for storing as a case events associated with objects;

script storage means for storing at least one script which describes a typically conducted series of operation and situation descriptions in time order with regard to the objects containing the case within said database;

case storage control means for defining a related link between a new case and a specific operation and situation description in said script relating to said new case in order to relate them and store said new case into said database; and case retrieval means for retrieving to output a case related by said related link from said database with respect to the specific operation and situation description designated in the specific script.

2. A case database storage/retrieval system as set forth in claim 1, wherein said case storage control means defines a similarity link between the operations and situations in said script having similarity in terms of meaning, between the operations and situations in said script and said script, and between the description of operations and situations of a specific script and the description of operations and situations in other scripts in order to relate them.

3. A case database storage/retrieval system as set forth in claim 1, wherein said case storage control means defines a similarity link between the operation and situation descriptions in said script having similarity in terms of meaning, between the operation and situation description in said script and said script, and between the description of operations and situations in a specific script and the description of operations and situations in other scripts in order to relate them, and said case retrieval means retrieves and outputs a case related by said related link from said database with regard to the description of designated specific operations and situations in a specific script, and retrieves and outputs from said database a case connected by said related link from the description of operations and situations in the script related by said similarity link.

4. A case database storage/retrieval system as set forth in claim 1, wherein said case storage control means defines by adding a similarity value showing a degree of similarity a similarity link between the operation and situation descriptions in said script having similarity in terms of meaning, between the operation and situation description in said script and said script, and between the description of operations and situations in a specific script and the description of operations and situations in other scripts in order to relate them, and said case retrieval means retrieves and outputs a case related by said related link from said database with regard to the description of designated specific operations and situations in a specific script, and retrieves and outputs together with said similarity value added to said similarity link from said database a case connected by said related link from the description of operations and situations in the script related by said similarity link.

5. A case database storage/retrieval system, comprising:

a database for storing as a case events associated with objects;

script storage means for storing at least one visual script which expresses components of said objects and a relation between the components in two-dimensional information, and has selective switches arranged for said two-dimensional information with regard to the objects containing the case within said database;

case storage control means for defining a related link between a new case and a specific switch in said visual script relating to said new case in order to relate them and store said new case into said database; and case retrieval means for retrieving to output a case related by said related link from said database, with respect to the specific switch designated in the specific visual script.

6. A case database storage/retrieval system as set forth in claim 5, wherein said case storage control means defines a similarity link between the two-dimensional information in said visual script having similarity in terms of meaning, and between the two-dimensional information in a specific visual script and the two-dimensional information in another visual script in order to relate them.

7. A case database storage/retrieval system as set forth in claim 5, wherein said case storage control means defines a similarity link between the two-dimensional information in said visual script having similarity in terms of meaning, and between the two-dimensional information in a specific visual script and the two-dimensional information in another visual script in order to relate them, and said case retrieval means retrieves and outputs a case related by said related link from said database with regard to a specific switch designated in a specific visual script, and retrieves and outputs from said database a case connected by said related link from a switch in the visual script related by said similarity link.

8. A case database storage/retrieval system as set forth in claim 5, wherein said case storage control means defines a similarity link by adding a similarity value showing a degree of similarity between the two-dimensional information in said visual script having similarity in terms of meaning, and between the two-dimensional information in a specific visual script and the two-dimensional information in another visual script in order to relate them, and said case retrieval means retrieves and outputs a case related by said related link from said database with regard to a specific switch designated in a specific visual script, and retrieves and outputs together with said similarity value added to said similarity link from said database a case connected by said related link from a switch in the visual script related by said similarity link.

9. A case database storage/retrieval system as set forth in claim 5, wherein said case storage control means defines a hierarchy link between the two-dimensional information in said visual script having similarity in terms of meaning and another visual script in order to relate them, and said case retrieval means outputs said other visual script related by said hierarchy link with respect to a specific switch designated in a specific visual script.

10. A case database storage/retrieval system as set forth in claim 5, wherein said case storage control means defines a similarity link by adding a similarity value showing a degree of similarity between the two-dimensional information in said visual script having similarity in terms of meaning, and between the two-dimensional information in a specific visual script and the two-dimensional information in another visual script in order to relate them, and defines a hierarchy link between the two-dimensional information in said visual script having similarity in terms of meaning and another visual script in order to relate them, and said case retrieval means retrieves and outputs a case related by said related link from said database with regard to a specific switch designated in a specific visual script, and retrieves and outputs together with said similarity value added to said similarity link from said database a case connected by said related link from a switch in the visual script related by said similarity link, and outputs said other visual script related by said hierarchy link with respect to a specific switch designated in the specific visual script.

11. A case database storage/retrieval system, comprising:

a database for storing as a case events associated with objects;

script storage means for storing a script which describes a typically conducted series of operation and situation descriptions in time order with regard to the objects containing the case within said database, and a visual script which represents in two-dimensional information components of said objects and a relation between the components and arranges a selectable switch for said two-dimensional information with respect to the objects containing the case within said database;

case storage control means for defining a related link between a new case and a switch of a specific operation and situation description in said script related to the new case or said visual script in order to relate them; and case retrieval means for retrieving to output a case related by said related link, with respect to the specific operation and situation description designated in the specific script.

12. A case database storage/retrieval system as set forth in claim 11, wherein said case storage control means defines a similarity link between the operation and situation descriptions in said script having similarity in terms of meaning, between two-dimensional information of said visual script, between the operation and situation description of a specific script and two-dimensional information of a visual script, and between the operation and situation description in said script or the two-dimensional information of said visual script and the operation and situation description or two-dimensional information of another script in order to relate them.

13. A case database storage/retrieval system as set forth in claim 11, wherein said case storage control means defines a similarity link between the operation and situation descriptions in said script having similarity in terms of meaning, between two-dimensional information of said visual script, between the operation and situation description in a specific script and two-dimensional information of a visual script, and between the operation and situation description in said script or the two-dimensional information of said visual script and the operation and situation description or two-dimensional information of another script in order to relate them, and said case retrieval means retrieves and outputs a case related by said related link from said database with regard to the specific operation and situation description or switch designated in a specific script, and retrieves and outputs from said database a case connected by said related link from the operation and situation description or switch in the script related by said similarity link.

14. A case database storage/retrieval system as set forth in claim 11, wherein said case storage control means defines a similarity link by adding a similarity value showing a degree of similarity between the operation and situation descriptions in said script having similarity in terms of meaning, between two-dimensional information of said visual script, between the operation and situation description of a specific script and two-dimensional information of a visual script, and between the operation and situation description in said script or the two-dimensional information of said visual script and the operation and situation description or two-dimensional information of another script in order to relate them, and said case retrieval means retrieves and outputs a case related by said related link from said database with regard to the specific operation and situation description or switch designated in a specific script, and retrieves and outputs together with said similarity value added to said similarity link from said database a case connected by said related link from the operation and situation description or switch in the script related by said similarity link.

15. A case database retrieval system, comprising:

a case database for storing as a case events associated with objects; and a collection of scripts which at least stores a script arranging in time order a unit description describing a typical operation or situation taken to reach an assumed target with respect to said objects, or a visual script expressing in two-dimensional information components of said objects and a relation between the components with respect to the objects and arranging a selectable switch for said two-dimensional information;

wherein among the unit description of said script and the two-dimensional information of the visual script, for the unit description or two-dimensional information related to a specific case of said case database, a related link is disposed to relate the specific case with an inquiry;

and wherein although the unit description of said script is not directly related to the two-dimensional information of the visual script, when the script is seen as a whole, said script is related to said specific case, then an indirectly related link is disposed to indicate an indirect relation between said script or said entire visual script and said specific case; and case retrieval means for retrieving to output from said database a case related by said related link or a case related by said indirect related link, with respect to the specific operation and situation description or switch designated in the specific script.

16. A case database retrieval system as set forth in claim 15, which further comprises:

disposing a similarity link having a similarity value to indicate a degree of similarity between similar unit descriptions contained in the same script or between two-dimensional information, and disposing a similarity link having a similarity value to indicate a degree of similarity between similar unit descriptions contained in different scripts or between two-dimensional information.

17. A case database retrieval system according to claim 16, wherein said case retrieval means comprises:

a step to retrieve and output from said case database a case related by said related link from said designated unit description or two-dimensional information, when there are other unit descriptions or two-dimensional information in the same script related by said similarity link from said designated unit description or two-dimensional information, a step to retrieve from said case database and to output together with the similarity value added to said similarity link a case related by said related link from said other unit description or two-dimensional information, a step to retrieve and output from said case database a case related by said indirect related link from said designated specific script or visual script, and when there are other unit descriptions or two-dimensional information in other scripts related by said similarity link from said designated unit description or two-dimensional information, a step to retrieve from said case database a case related by said related link and the unit description or two-dimensional information in said other scripts, and to output a word and case representing that said case is related to said other scripts.

* * * * *